United States Patent
Toledo Antonio et al.

(10) Patent No.: US 8,658,126 B2
(45) Date of Patent: *Feb. 25, 2014

(54) NANOSTRUCTURED TITANIUM OXIDE MATERIAL AND ITS SYNTHESIS PROCEDURE

(75) Inventors: Jose Antonio Toledo Antonio, Mexico City (MX); Carlos Angeles Chavez, Mexico City (MX); Maria Antonia Cortes Jacome, Mexico City (MA); Fernando Alvarez Ramirez, Mexico City (MX); Yosadara Ruiz Morales, Mexico City (MX); Gerardo Ferrat Torres, Mexico City (MX); Luis Francisco Flores Ortiz, Mexico City (MX); Esteban Lopez Salinas, Mexico City (MX); Marcelo Lozada y Cassou, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,245

(22) Filed: Jun. 19, 2012

(65) Prior Publication Data

US 2012/0301526 A1    Nov. 29, 2012

Related U.S. Application Data

(60) Continuation of application No. 12/848,392, filed on Aug. 2, 2010, now abandoned, which is a division of application No. 12/623,993, filed on Nov. 23, 2009, now Pat. No. 7,799,313, which is a division of application No. 11/121,178, filed on May 4, 2005, now Pat. No. 7,645,439, which is a continuation-in-part of application No. PCT/MX2004/000035, filed on May 26, 2004, and a continuation-in-part of application No. PCT/MX03/00081, filed on Oct. 10, 2003.

(60) Provisional application No. 60/646,973, filed on Jan. 27, 2005.

(30) Foreign Application Priority Data

May 4, 2004   (MX) ............... PA/a/2004/004265

(51) Int. Cl.
| | | |
|---|---|---|
| *C01G 25/02* | (2006.01) | |
| *C01G 27/02* | (2006.01) | |
| *C01G 23/00* | (2006.01) | |
| *C01D 1/02* | (2006.01) | |
| *C01B 6/24* | (2006.01) | |

(52) U.S. Cl.
USPC ...... 423/608; 423/598; 423/594.15; 423/644; 977/734

(58) Field of Classification Search
USPC ......... 423/608, 609, 610, 611, 612, 613, 614, 423/598, 594.15, 644; 977/734, 762, 765, 977/811, 823

See application file for complete search history.

(56) References Cited

U.S. PATENT DOCUMENTS

| | | | |
|---|---|---|---|
| 2,833,620 A | 5/1958 | Gier et al. | |
| 4,689,211 A | 8/1987 | Nishiuchi et al. | |
| 4,705,762 A | 11/1987 | Ota et al. | |
| 5,098,684 A | 3/1992 | Kresge et al. | |
| 5,102,643 A | 4/1992 | Kresge et al. | |
| 5,776,239 A * | 7/1998 | Bruno ........................... 106/437 |
| 6,027,775 A | 2/2000 | Kasuga et al. | |
| 6,099,798 A | 8/2000 | Kambe et al. | |
| 6,537,517 B1 | 3/2003 | Kasuga et al. | |
| 2004/0265587 A1 | 12/2004 | Koyanagi et al. | |

FOREIGN PATENT DOCUMENTS

| | | |
|---|---|---|
| KR | 2003-0026268 | 3/2003 |
| WO | 03/037798 | 5/2003 |

OTHER PUBLICATIONS

Estermann et al., "A Synthetic Gallophosphate Molecular Sieve with a 20-tetrahedral-atom Pore Opening", Nature, vol. 352, Jul. 25, 1991, 320-323.

Freeman et al., "Bioreversible Protection for the Phospho Group: Chemical Stability and Bioactivation of Di(4-acetoxybenzyl) Methylphosphonate with Carboxyesterase", J. Chem. Soc., Chem. Commun., 1991, 875-877.

Beck et al., "A New Family of Mesoporous Molecular Sieves Prepared with Liquid Crystal Templates", J. Am. Chem. Soc., 1992, vol. 114, No. 27, 10834-10843.
Kroto et al., "C60: Buckminsterfullerene", Nature, vol. 318, Nov. 14, 1985, 162-163.
Iijima, "Helical Microtubules of Graphitic Carbon", Nature, vol. 354, Nov. 7, 1991, 56-58.
Tenne et al., "Polyhedral and Cylindrical Structures of Tungsten Disulpyhide", Nature, vol. 360, Dec. 3, 1992, 444-446.
Rao et al., "Inorganic Nanotubes", Dalton Trans., 2003, 1-24.
Lozada et al., "The Force Between Two Planar Electrical Double Layers", J. Chem. Phys., vol. 80, No. 7, Apr. 1, 1984, 3344-3349.
Lozada et al., "Three Point Extension for Hypernetted Chain and Other Integral Equation Theories: Numerical Results", J. Chem. Phys., vol. 92, No. 2, Jan. 15, 1990, 1194-1210.
Yeomans et al., "The Structure of Electrolytes in Cylindrical Pores", J. Chem. Phys. vol. 98, No. 2, Jan. 15, 1993, 1436-1450.
Degreve, "Monte Carlo and HNC/MSA Results for an Asymmetrical Electrolyte in an External Electrical Field of Spherical Geometry", Molecular Physics, vol. 86, No. 4, 1995, 759-768.
Lozada et al., "Violation of the Electroneutrality Condition in Confined Charged Fluids", Physical Review E, vol. 53, No. 1, Jan. 1996, 522-530.
Lozada et al., "Correlation of Charged Fluids Separated by a Wall", Physical Review Letters, vol. 77, No. 19, Nov. 4, 1996, 4019-4022.
Lozada et al., "Correlation of Charged Fluids Separated by a Wall of Finite Thickness: Dependence on the Charge of the Fluid and the Wall", Physical Review E, vol. 56, No. 3, Sep. 1997, 2958-2965.
Yu et al., "Charge Separation in Confined Charged Fluids", Physical Review Letters, vol. 79, No. 19, Nov. 10, 1997, 3656-3659.
Ma et al., "Nanotubes of Lepidocrocite Titanates", Chemical Physics Letters., vol. 380, 2003, 577-582.
Tsai et al., "Regulation of the Physical Characteristics of Titania Nanotube Aggregates Synthesized from Hydrothermal Treatment", Chem. Mater., vol. 16, No. 22, 2004, 4352-4358.
Watanabe et al., "A New Member of Sodium Titanates, Na2Ti9O19", Journal of Solid State Chemistry, 28, 397-399 (1979).
Watanabe, "The Investigation of Sodium Titanates by the Hydrothermal Reactions of TiO2 with NaOH", Journal of Solid State Chemistry, 36, 91-96 (1981).
Leinonen et al., "Sodium-Hydrogen Ion Exchange in Sodium Titanate Na4TigO20xH2O1.2", Radiochemistry, vol. 40, No. 6, 1998, pp. 503-506.
Koelsch et al., "Electrochemical comparative study of titania (anatase, brookite, and rutile) nanoparticles synthesized in aqueous medium", Thin Solid Films 451-452 (2004) 86-92.
Armstrong, A.R. et al., TiO2-B Nanowires, Angew. Chem. Int. Ed., 2004, 43, 2286-2288, Published Online: Apr. 16, 2004.
Zhu, H. et al., Hydrogen Titanate Nanofibers Covered with Anatase Nanocrystals: A Delicate Structure Achieved by the Wet Chemistry Reaction of the Titanate Nanofibers, J. Am. Chem. Soc., 2004, 126, 8380-8381.
Kasuga et al., Formation of Titanium Oxide Nanotube, Langmuir, 1998, 14, 3160-3163.
Abstract and bibliographic information for Armstrong et al., TiO2-B Nanowires, Angew. Chem. Int. Ed., 2004, 43, 17, 2286-2288, Published Online: Apr. 16, 2004.

* cited by examiner

*Primary Examiner* — Anthony J Zimmer
(74) *Attorney, Agent, or Firm* — Roylance, Abrams, Berdo & Goodman, L.L.P.

(57) ABSTRACT

Nanomaterials of the JT phase of the titanium oxide $TiO_{2-x}$, where $0 \leq x \leq 1$ having as a building block a crystalline structure with an orthorhombic symmetry and described by at least one of the space groups 59 Pmmn, 63 Amma, 71 Immm or 63 Bmmb. The nanomaterials are in the form of nanofibers, nanowires, nanorods, nanoscrolls and/or nanotubes and are obtained from a hydrogen titanate and/or a mixed sodium and hydrogen titanate precursor compound that is isostructural to the JT crystalline structure. The titanates are the hydrogenated, the protonated, the hydrated and/or the alkalinized phases of the JT crystalline phase that are obtained from titanium compounds such as titanium oxide with an anatase crystalline structure, amorphous titanium oxide, and titanium oxide with a rutile crystalline structure, and/or directly from the rutile mineral and/or from ilmenite.

12 Claims, 13 Drawing Sheets

NANOSTRUCTURED TITANIUM OXIDE MATERIAL AND ITS SYNTHESIS PROCEDURE

CROSS-REFERENCE TO RELATED APPLICATIONS

This application is a continuation application of Ser. No. 12/848,392, filed Aug. 2, 2010, which, in turn, is a divisional application of Ser. No. 12/623,993, filed Nov. 23, 2009, now U.S. Pat. No. 7,799,313. Application Ser. No. 12/623,993 is a divisional application of Ser. No. 11/121,178, filed May 4, 2005, now U.S. Pat. No. 7,645,439. Application Ser. No. 11/121,178 is a continuation-in-part of International Application No. PCT/MX2004/000035, with an international filing date of May 26, 2004, and International Application No. PCT/MX2003/000081, with an international filing date of Oct. 10, 2003. This application also claims the benefit under 35 U.S.C. §119(a) of Mexican Patent Application No. PA/a/2004/004265, filed May 4, 2004, and under 35 U.S.C. §119(e) of provisional application Ser. No. 60/646,973, filed Jan. 27, 2005. The disclosures of all of the foregoing applications are incorporated herein by reference in their entirety.

Reference is made to application Ser. No. 11/121,179, filed May 4, 2005, of Jose Antonio Toledo Antonio et al., entitled "Selective Adsorbent Material And Its Use", now U.S. Pat. No. 7,416,655, which issued on Aug. 26, 2008.

FIELD OF THE INVENTION

The present invention relates to nanomaterials of titanium oxide ($TiO_{2-x}$, where $0 \leq x \leq 1$), which have as a building block a crystalline structure with an orthorhombic symmetry. The new crystalline structure is the basic unit of construction of nanomaterials which are nanofibers, nanowires, nanorods, nanoscrolls and/or nanotubes. These nanomaterials are obtained from a precursor that is isostructural to the new crystalline structure. The precursor is composed of hydrogen titanate and/or a mixed sodium and hydrogen titanate. These titanates are the hydrogenated, protonated, hydrated and/or the alkalinized phases of the new crystalline structure. In addition, this invention also relates to the procedure of synthesis of the nanomaterials.

BACKGROUND OF THE INVENTION

Researchers in the catalysis and materials fields have focused considerable efforts on the design of new porous materials, either synthetic or natural with enhanced textural properties, through innovating synthesis procedures as the molecular molding. Generally the porous structure of such solids is formed during its crystallization or during further treatments.

The porous materials are classified, depending on their predominating pore size, as: 1) microporous, with pore sizes <1.0 nm; 2) mesoporous, with pore sizes between 1.0 and 50.0 nm, and 3) macroporous, with pore sizes surpassing 50.0 nm. Of all of them, the macroporous solids have a limited use as adsorbers or catalysts due to the fact that they generally present a low surface area and their large pores are not uniform. On the other hand, the microporous and mesoporous solids are widely used in the technologies of adsorption, separation and catalysis, particularly for the processing and refining of oil. For such applications, nowadays, there is an increase in the demand of new materials with a well defined and homogeneous pore distribution, thermally stable, with a high specific area and large pore volumes; in order to make more efficient the physical and/or chemical processes in which these materials are used.

The porous materials can have an amorphous or nanocrystalline structure. The amorphous materials, such as silica gel or alumina gel, do not have any crystallographic order, while nanocrystalline solids such as transition alumina, gamma or eta, present a partially ordered structured. Generally, these two kinds of materials display a very wide pore distribution, which limits their effectiveness as catalysts, adsorbents and/or ionic exchange systems. The wide pore distribution limits mainly the use of these materials in oil refining processes.

Zeolites and the molecular sieves are a clear example of uniformity in the pore sizes that have to be rigorously established. However, the pore size distribution is limited to the microporous region, due to the fact that the pores are formed from the cavities and/or channels that form the structure itself; therefore, molecules of big dimensions cannot be processed in this type of materials. On the other hand, these materials are generally synthesized under hydrothermal conditions in the presence of a porogen agent that engineers the porous structure.

The need to expand the uniformity and the homogeneity of the pore sizes from the microporous region to the mesoporous region, thus allowing the adsorption and processing of bigger molecules, has led to the search of new organic agents capable of engineering new structures. This has given origin to molecular sieves with bigger pore size as the aluminophosphates, galliophosphates, etc. (Nature, vol. 352, 320-323 (1991); J. Chem. Soc. Chem. Commun., 875-876 (1991)). However, these structures are not thermally stable.

With the discovery of the mesoporous silicates and aluminosilicates in 1992 (U.S. Pat. Nos. 5,098,684 and 5,102,643), a new stage in the development of ordered mesoporous materials started. This type of materials, called M41S, have a uniform pore size, which is adjustable to an interval between 1.3 and 10.0 nm. Such materials display a pore wall with a thickness between 0.8 and 1.2 nm and a crystal size over 50.0 nm. On the other hand, depending on the general conditions of synthesis, in particular on the concentration of the organic porogen agent, the M41S materials can have an hexagonal morphology (MCM-41), a cubic morphology (MCM-48), or a laminar structure (J. Am, Chem. Soc., vol. 114, 834-843 (1992)). This implies a formation mechanism based on strong electrostatic interactions and/or the ionic pairing between the oligomer silicate precursor and the structure engineering agent, making the removal of the later difficult.

The discovery of the carbon fullerene structure ($C_{60}$) during the 80s, which consists of a hollow sphere whose wall is made up of sixty carbon atoms (Nature, vol. 318, 162-163 (1985)), led to a new materials era of great discoveries as, for example, the carbon nanotubes (Nature, vol. 354, 56-58 (1991)). These structures and/or the nanotubular morphologies present interesting physical and chemical properties, making them suitable for the construction of nanoelectronic innovating devices, among other applications. Due to this, the synthesis of nanomaterials of carbon and inorganic materials has boomed in the past few years. In 1992 the first nanotubes and/or structures fullerene type of $MoS_2$ and $WS_2$ (Nature, vol. 360, 444-446 (1992)), were obtained. Since then a great variety of nanomaterials includes: inorganic oxides such as: $VO_2$, $ZrO_2$, $TiO_2$, $SiO_2$, $Al_2O_3$, $ZnO$ and $TeO_2$, sulphides, selenides, telurides, nitrates and transition metal carbides; among others (Dalton Trans., 1-24 (2003)).

On the other hand, a series of studies in confined fluids (M. Lozada-Cassou et al. J. Chem. Phys., vol. 80, 3344-3349 (1984); J. Chem. Phys., vol. 92, 1194-1210 (1990); J. Chem. Phys., vol. 98, 1436-1450 (1993); Mol. Phys., vol. 86, 759-

768 (1995); Phys., Rev. E., vol. 53, 522-539 (1996); Phys. Rev. Letts., vol. 77, 4019-4022 (1996); Phys. Rev. E., vol. 56, 2958-2965 (1997); Phys. Rev. Letts., vol. 79, 3656-3659 (1997)), showed that the confinement and curvature at nanoscale produces electric fields and molecular strengths of outstanding intensity. These studies show, for example, that in nano-confinement a separation of charge in the ionic fluid can occur (Phys. Rev. Letts., vol. 79 656-659 (1997)), which implies confinement pressures in the order of 1,250 atm and intermolecular repulsion forces of $5 \times 10^{-9}$ N. This result highlights the importance of the confinement for the molecular separation and it oriented the present invention towards the search of tubular structures at nanometric scale and to the development of new materials with enhanced catalytic properties, semiconductive properties, etc.

The nanotubes are materials that are applied, for example, in processes involving adsorption phenomena, as they increase the contact area by exposing the internal surface, the external surface, the surface in the vertex and the surface in the interlayer regions that compose the walls. This together with the increase of the intensity in the force fields, due to curvature and confinement of the nanotubes, enhance the catalytic activity of catalysts or of active phase materials supported on nanotubes. According to the porous materials classification, the nanotubes present mesopores which are homogeneous with a size between 1 to 50 nm and with a high pore volume. These characteristics make the nanotubes potentially useful as catalytic supports or as catalysts.

In the past it has been possible to synthesize nanotubes with walls composed of zirconium oxide, alumina, titania with anatase structure, and transition metal sulfides among others, by means of methods involving the addition of a structure engineering agent, consisting of a cationic, anionic and/or neutral tensoactive agent. However, the tensoactive elimination through calcinations, leads in most cases to the collapse of the nanotubular structure.

Other procedures in the nanotubes synthesis consist in the application of porous membranes, organic or inorganic, to guide the nanotube formation; however, they are generally applied for the case of materials whose structure is compact or tridimensional (3D). The materials with bidimensional structures (2D), like plates and/or sheets, can form unidimensional materials (1D) of the nanotube type and/or nanofibers, by the direct bending and/or rolling of its structure, due to temperature effect, to pressure or to the application of an electric potential, etc.

Titanium oxide is commonly presented as a tridimensional structure material (3D) and it is basically used as a semiconductor material in the construction of electronic and optoelectronic devices, in the manufacturing of pigments and coatings, as catalyst and/or catalyst support in several processes, as photocatalyst in the degradation of organic compounds during environmental protection processes, as photosensitive material in the construction of fuel cells and solar cells, etc.

Titanium dioxide is known to exist in three crystalline phases, anatase, rutile and brookite, as well as an amorphous phase. There are other phases but these ones are the most common. The anatase and rutile phases have a tetragonal crystal lattice, and the brookite phase has an orthorhombic crystal lattice or structure. This information is well known in the area. The anatase and rutile phases which have a tetragonal crystal lattice are different even though they both have a tetragonal crystal lattice. The differences stem from the position of the atoms, the surroundings of the atoms, the lattice parameters, and the space group inside the tetragonal crystal lattice, and because these parameters are different these two phases are differentiated with different names (anatase and rutile). Each phase presents different properties and among all of the phases anatase is the one that has most applications, due to the fact that it can be obtained easily through a conventional chloride or sulfide process.

On the other hand, nanotubes and/or titanium oxide nanofibers with the anatase structure have been obtained, improving in this way the textural properties of the titanium oxide. In this direction, published U.S. Application No. 2004/0265587 describes a procedure to obtain tubular $TiO_2$ particles with the anatase structure, with an external diameter of 5 to 40 nm, with lengths of 50 to 1,000 nm and a specific area of 450 $m^2/g$ if only one hydrothermal treatment is carried out and a specific area in the range of 400 $m^2/g$ to 500 $m^2/g$, if two hydrothermal treatments are carried out; thus in general the synthesis requires two stages of hydrothermal treatment which involves an alkaline metal and an organic alkaline base. The inventors apply such tubular particles as photocatalysts and/or materials for the construction of photoelectric cells showing good results.

U.S. Pat. No. 6,537,517 refers to a process for titanium oxide production with tubular morphology and anatase structure, with or without the presence of silicon oxide, by means of a hydrothermic treatment involving an alkaline metal hydroxide. The $TiO_2$ nanotubes with anatase structure present specific surface areas between 200 and 500 $m^2/g$. It has been published in the literature (Ma, R.; Bando, Y.; Sasaki, T. *Chemical Physics Letters,* 2003, 380, 577-582) that it is possible that the so claimed anatase nanotubes in the aforementioned patent might have a lepidocrocite-type structure instead of the so claimed anatase structure. The lepidocrocite structure is defined for an iron oxide compound (iron (III) oxide hydroxide, also known as γ-(FeOOH)). A lepidocrocite-type structure would mean that the so claimed anatase-$TiO_2$ nanotubes would have the same structure as the iron (III) oxide hydroxide and the same space group; however, the cell parameters cannot be exactly the same neither the atoms positions because in one case the titanium atom is involved and in the other case the iron atom is involved. Thus it is clear that the state of the art is that the crystalline structure, space group(s) and atomic positions in the unit cell that composes the so claimed nanotubular anatase-$TiO_2$ structure is not known.

A synthesized nanostructure with a phase different to anatasa is given in the Korean laid-open patent application No. P2003-0026268 where the synthesis of nanoparticles (balls or spherical crystal with a nanometric size), mostly with the brookite phase, which is known to have an orthorhombic crystal lattice, and some rutile phase, with tetragonal crystal lattice, is reported. The starting materials for the synthesis are $TiCl_4$ and $HNO_3$.

In the case of the U.S. Pat. No. 6,537,517 the starting material is a powder of crystalline titanium oxide (crystalline titania powder with the anatase or rutile phase) with an average particle size between 2 to 100 nm, preferably from 2 to 30 nm (the size of the crystallites that compose the particles is not provided). The starting material is subjected to a hydrothermal treatment, in the presence of an alkali metal hydroxide, that comprises one step. However, as it is already mentioned in the published U.S. Application No. 2004/0265587, the use of a titania powder as starting material does not produce a high yield of the titania nanotubes with anatase phase. On the contrary spherical particles are synthesized in a higher yield than the nanotubes and the final product presents a large residual amount of sodium that hinders the efficiency of the nanotubes as possible catalyst. Also in U.S. Pat. No. 6,537,517 it is mentioned that the nanotube titania obtained from the alkali hydrothermal treatment may further be heat-treated at from 200 to 1,200° C. to improve the crystallinity of $TiO_2$ and to increase the catalytic activity and that the nanotube does not collapse through this heat treatment. It is not mentioned how the heat treatment is performed. It is assumed that it was done as a regular well known heat treatment which would involve a static, non-dynamic air atmosphere by placing the product in an oven. It is claimed that the heat treatment is expected to improve the crystallinity and activity of the nanotubes. However, there is no table or data comparing the properties of the nanotubes before and after such heat treatment. Very recently it has appeared in the literature a paper entitled "Regulation of the Physical Characteristics of Titania Nanotube Aggregates Synthesized from Hydrothermal Treatment" (Chien-Cheng Tsai and Hsisheng Teng, *Chemistry of Materials* 2004, 16, 4352-4358) where the precursor used is a commercial $TiO_2$ powder with a composition 70% anatase and 30% rutile, and a primary particle size of 21 nm (same method of synthesis as the reported in U.S. Pat. No. 6,537,517). In this paper the authors study how the stability and pore structure (surface area) of the obtained nanotubes vary with subsequent calcination at different temperatures (they do not give any specifics about the calcination procedure, thus it is assumed to be static air in an oven). The authors of the mentioned literature paper found that the as-synthesized anatase nanotubes remain tube-like at 400° C. but these nanotubes have a sharp surface area decrease with the calcination temperature sintering (collapsing) at 600° C. to form anatase rodlike structures. Subsequently the rodlike structure agglomerates at 800° C., forming anatase cylindrical particles, and at 900° C. these particles go through a phase transformation to the rutile phase. These results contradict use of thermal treatment over the interval (200° C. to 1200° C.) in U.S. Pat. No. 6,537,517 to improve crystallinity without collapse or phase transformation at the high temperature.

In published U.S. Application No. 2004/0265587, titanium oxide sol is used as a starting material in which particles (no powders) with specific average particle diameters (2 to 100 nm, preferably 5 to 80 nm) are dispersed in water to prepare a water dispersion sol which is used as starting material. The synthesis method outlined in published U.S. Application No. 2004/0265587 to obtain tubular titanium oxide particles involves preparing the water dispersion sol (this step requires heating and many steps). Then the water dispersion sol of titanium oxide particles is subjected to a one step of hydrothermal treatment followed by washing and calcining, or the water dispersion sol of titanium oxide particles is subjected to a two hydrothermal treatments instead of one. The first hydrothermal treatment is carried out in the presence of an alkali metal hydroxide together with ammonium hydroxide and/or an organic base. The presence of the ammonium hydroxide and/or an organic base is claimed to reduce the alkali metal impurities in the tubular titanium oxide particles. The hydrothermal treatment is carried out at temperatures between 80 to 250° C. (which is a higher temperature than the required in the U.S. Pat. No. 6,537,517). While in the second hydrothermal treatment the presence of a cation is required and the temperature is the same as in the first hydrothermal treatment. The synthesis presented in published U.S. Application No. 2004/0265587 involves many steps, many reactants, high temperatures and possibly a second hydrothermal treatment, and consequently the method becomes industrially of high cost; also high temperatures are required in both hydrothermal treatments. The method in published U.S. Application No. 2004/0265587 also involves a heating treatment (named as "reduction treatment") in an inert gas atmosphere, under reduced pressure or in a reducing gas atmosphere. It is not said if this so called reduction treatment is done in a dynamic flow or static flow of the gas that composes the atmosphere, thus it is assumed that it is carried out in a static way. The formula of the final product given in published U.S. Application No. 2004/0265587 includes nitrogen and another transition metal different to titanium in the case of preparing mixed metal compounds or M=Ti if not mixed metal synthesis is carried out. The given formula of the claimed synthesized tubular titanium oxide particles with anatase, or rutile, or brookite phase is $Ti_aM_bO_xN_y$. Experimental evidence on all the cell parameters to support the indication that the tubular titanium oxide particles have anatase, or rutile, or brookite phase is not provided in published U.S. Application No. 2004/0265587.

SUMMARY OF THE INVENTION

The present invention relates to nanomaterials of titanium oxide ($TiO_{2-x}$, where $0 \le x \le 1$), which have as a building block a crystalline structure with an orthorhombic symmetry described by at least one of the space groups 59 Pmmn, 63 Amma, 71 Immm or 63 Bmmb. The positions of the atoms, their surroundings, the crystal parameters and space groups in the crystalline materials of the present invention do not match any of the known phases of titanium dioxide (anatase, brookite, rutile) or the not so well known phases (beta and others). The new crystalline structure forms the basic unit of construction of nanomaterials which are nanofibers, nanowires, nanorods, nanoscrolls and/or nanotubes. The nanomaterials are obtained from a precursor that is isostructural to the new crystalline structure and is a hydrogen titanate and/or a mixed sodium and hydrogen titanate. These titanates are the hydrogenated, protonated, hydrated and/or the alkalinized phases of the new crystalline structure. The new crystalline structure is named the "JT phase" of the $TiO_{2-x}$, The term "JT phase" as used herein means a crystalline structure or crystalline phase with an orthorhombic symmetry having the formula $TiO_{2-x}$, wherein $0 \le x \le 1$, and has at least one of the space groups 59 Pmmn, 63 Amma, 71 Immm or 63 Bmmb.

Also, this invention further involves the procedure of synthesis of the nanomaterials, which have as a building block the new JT phase. The new nanomaterials after being subjected to dynamic thermal treatment in an inert, oxidizing or reducing atmosphere have a stable nanotubular structure that is preserved intact without collapse, thus maintaining their fibrilar morphology and high specific area. It has been discovered that the hydrogen titanate and mixed sodium and hydrogen titanate nanotubes, that are unstable when heated higher than 300° C. in air in an oven can be stabilized by heating in a dynamic oxidizing, inert or reducing flowing atmosphere, which transforms the titanate nanotubes into the stable, oxygen deficient JT phase nanotubes.

The nanomaterials of the present invention are useful mainly as a support for catalysts and/or as catalysts, as photocatalysts, as adsorbents, as semiconductors in the construction of electronic devices, in photoelectric cells, in pigments and cosmetics, among other applications.

Thus, one aspect of the present invention relates to nanomaterials of titanium oxide ($TiO_{2-x}$, where $0 \le x \le 1$), which have as building block a crystalline structure with an orthorhombic symmetry described by at least one of the space groups 59 Pmmn, 63 Amma, 71 Immm or 63 Bmmb. The new crystalline structure is the basic unit of construction of nanomaterials which are nanofibers, nanowires, nanorods, nanoscrolls and/or nanotubes. The nanomaterials are obtained from a precursor that is isostructural to the new crystalline structure. The precursor is a hydrogen titanate and/or a mixed sodium and hydrogen titanate. These titanates are the hydrogenated, protonated, hydrated and/or the alkalinized phases of the new crystalline structure.

Another aspect of this invention relates to a procedure for the synthesis of the nanomaterials, which involves among other stages: an alkaline treatment of the starting materials followed by a thermal treatment under either reflux conditions or hydrothermal treatment at atmospheric pressure, controlled or autogenous and continuous stirring; then a treatment of ionic exchange is carried out, which can be done in aqueous media with different levels of acidity or in alcoholic media or in aqueous media, to obtain the hydrogen titanates or the mixed sodium and hydrogen titanates. Finally, the titanates are subjected to a dynamic thermal treatment stage in an inert, oxidizing or reducing atmosphere to produce a nanomaterial with an orthorhombic lattice described by at least one of the space groups 59 Pmmn, 63 Amma, 71 Immm or 63 Bmmb.

A further aspect of the present invention is to provide a procedure to synthesize the nanomaterials with the structure $TiO_{2-x}$ JT phase, where $0 \leq x \leq 1$, and that presents a fibrilar morphology and/or a tubular morphology depending on the general conditions during the synthesis procedure.

A further aspect of the present invention is to provide nanomaterials of titanium oxide ($TiO_{2-x}$, where $0 \leq x \leq 1$), which have a new crystalline structure and are obtained from an isostructural precursor composed of hydrogen titanate and/or a mixed sodium and hydrogen titanate which correspond to the hydrogenated, protonated, hydrated and/or the alkalinized phases of the new crystalline structure.

Another aspect of the present invention is to provide nanomaterials of titanium oxide ($TiO_{2-x}$, where $0 \leq x \leq 1$), which have a new crystalline structure that presents a fibrilar morphology or nanotubular morphology obtained by a process which comprises an stage of thermal treatment in a controlled dynamic atmosphere composed of air, $O_2$, $N_2$, He, Ar or a mixture thereof at any concentration or in a controlled dynamic atmosphere composed of a mixture of inert gas and $H_2$ in a concentration of 5% or 30% by volume of $H_2$ based on the total volume of gas, in a dynamic heating regime starting from an isostructural precursor composed of hydrogen titanate and/or a mixed sodium and hydrogen titanate.

BRIEF DESCRIPTION OF THE DRAWINGS

With the objective of obtaining an understanding of the crystalline structure, which is the building block of the nanomaterials of titanium oxide of the present invention, called $TiO_{2-x}$ JT phase; where x varies between 0 and 1 due to the fact that this crystalline structure presents a high oxygen deficiency, and is described by at least one of the space groups 59 Pmmn, 63 Amma, 71 Immm or 63 Bmmb, reference is made to the following Figures:

FIGS. 1a, 1b and 1c are scanning electron microscopy images (SEM) where it is observed the nanofibrilar and/or nanotubular morphology of the hydrogen titanate, of the mixed sodium and hydrogen titanate and of the $TiO_{2-x}$ JT phase, where $0 \leq x \leq 1$ in which:

FIG. 1a shows nanofibers and/or nanotubes obtained at low temperature, from 50 to 130° C., FIG. 1b shows nanofibers and/or nanotubes obtained at medium temperature, from 130 to 160° C. and FIG. 1c shows nanofibers and/or nanotubes of $TiO_{2-x}$ JT phase, where $0 \leq x \leq 1$, obtained after dynamic thermal treatment of the hydrogen titanates, or the mixed sodium and hydrogen titanates synthesized at high temperature, between 160 and 180° C.;

FIGS. 3a-3f are illustrative examples of the typical transmission electron microscopy images obtained for the present hydrogen titanate and/or mixed sodium and hydrogen titanate and the $TiO_{2-x}$ JT phase, where $0 \leq x \leq 1$.

FIG. 4 is an illustrative example of the typical X-ray diffraction patterns obtained for the hydrogen titanate and/or mixed sodium and hydrogen titanate. The intensity of the peaks might change but not their position;

FIG. 9(a) shows a three-dimensional (3D) view of the unit cell. FIG. 9(b) shows a bi-dimensional (2D) view of the unit cell in the (a, b) crystalline plane. As indicated, the positions of the atoms, their surroundings, the crystal parameters and space groups in our materials do not match with any of the known titanium dioxide phases (anatase, brookite, rutile, amorphous) or with the not so well known phases (beta and others);

FIG. 11a—transmission electron microscopy (TEM) image, which presents the morphology of the nanotubes of $TiO_{2-x}$ JT phase, where $0 \leq x \leq 1$; FIG. 11b—experimental electron diffraction pattern of the nanotube or nanofiber presented in FIG. 11a and where the reflections (200) and (020) associated with cell parameters a and b respectively are shown as well as the angle formed; FIG. 11c—the theoretically calculated electron diffraction pattern, for the theoretical model of the JT phase, with orthorhombic structure that is presented in FIGS. 9a and 9b; FIG. 11d—experimental electron diffraction pattern of a nanotube where the reflections (001) and (020) associated with cell parameters c and b respectively are shown, as well as the angle formed;

DETAILED DESCRIPTION OF THE INVENTION

The nanomaterials of titanium oxide of the present invention have as a building block a crystalline structure with an orthorhombic symmetry, and are referred to as the JT phase of the $TiO_2$, where $0 \le x \le 1$ and preferably x is between 0.1 and 0.95. The new crystalline structure is the basic unit of construction of nanomaterials which are nanofibers, nanowires, nanorods, nanoscrolls and/or nanotubes. The nanomaterials are obtained from a precursor that is isostructural to the new crystalline structure. The precursor is a hydrogen titanate and/or a mixed sodium and hydrogen titanate. These titanates are the hydrogenated, protonated, hydrated and/or the alkalinized phases of the new crystalline JT phase. In the structure of the $TiO_{2-x}$ JT phase, x can vary form 0 to 1 due to the fact that the structure has an oxygen deficiency, which makes it a useful material for applications that involve surface adsorption phenomenon, among other applications.

Likewise, this invention is related to the procedure of synthesis of the present nanomaterials, which involves among other stages: an alkaline treatment of the starting materials followed by a thermal treatment under either reflux conditions or hydrothermal treatment at atmospheric pressure, controlled or autogenous; then a treatment of ionic exchange is carried out, which can be done in alcoholic and/or in aqueous media or in aqueous media with different levels of acidity, to thus obtaining the hydrogen titanates or the mixed titanates of hydrogen and sodium. Finally, the titanates are subjected to a dynamic thermal treatment stage in an inert, oxidizing or reducing atmosphere to producing a material with an orthorhombic lattice denominated as the JT phase of the $TiO_{2-x}$, where $0 \le x \le 1$.

The calculated cell parameters of the unit cell of the $TiO_{2-x}$ JT, where $0 \le x \le 1$, are reported in Table 9 and they vary between the following intervals: a from 0.283 to 0.324 nm, b from 0.354 to 0.395 nm and c from 0.695 to 0.735 nm, for the case of the 59 Pmmn space group, and from 1.408 nm to 1.453, for the case of the 63 Amma, 71 Immm, and 63 Bmmb space groups; with $\alpha = \beta = \gamma = 90°$. The cell parameters depend on the general synthesis conditions of the hydrogen titanates and/or the mixed sodium and hydrogen titanates and on the conditions during the dynamic thermal treatment of them, under a controlled dynamic atmosphere and a temperature in the range of 200° C. and 500° C., preferably between 200° C. and 450° C., and most preferably between 200° C. and 400° C.

Figure 8:
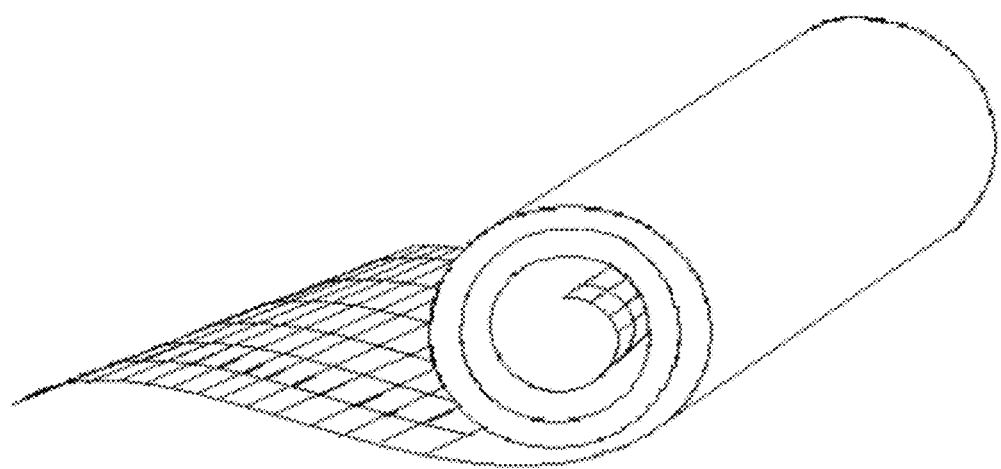
FIG. 8 shows the model of the formation of the tubular structures starting from an inwards rolled layer and/or sheet.
Figure 9A:
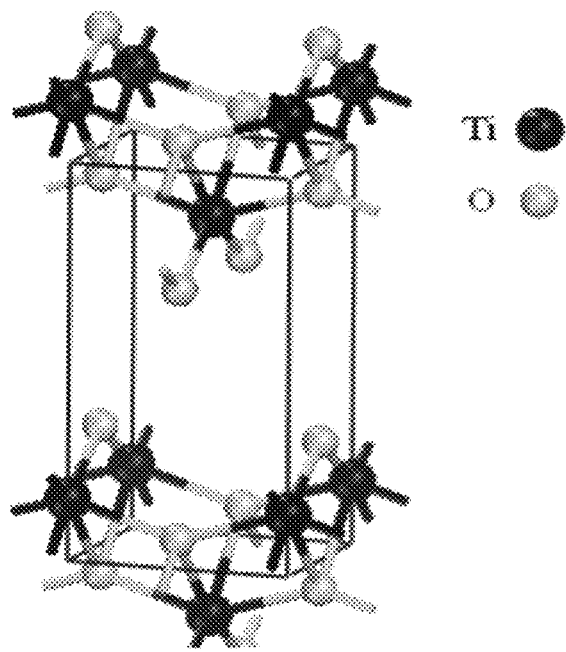
FIGS. 9a and 9b show the basic structural crystalline cell or unit of the $TiO_{2-x}$ JT phase, where $0 \leq x \leq 1$. The crystalline unit has an orthorhombic symmetry, and is described by at least one of the space groups 59 Pmmn, 63 Amma, 71 Immm or 63 Bmmb, and it is the building block of the nanomaterials, which are obtained from the synthesis procedure of the present invention.
Figure 9B:
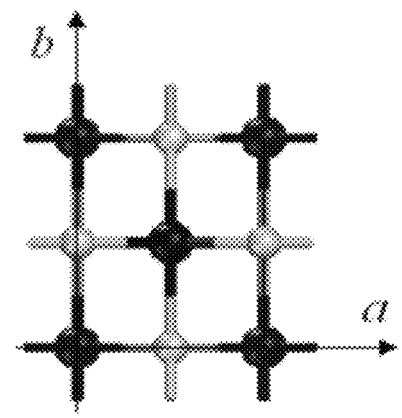
Figure 10A:
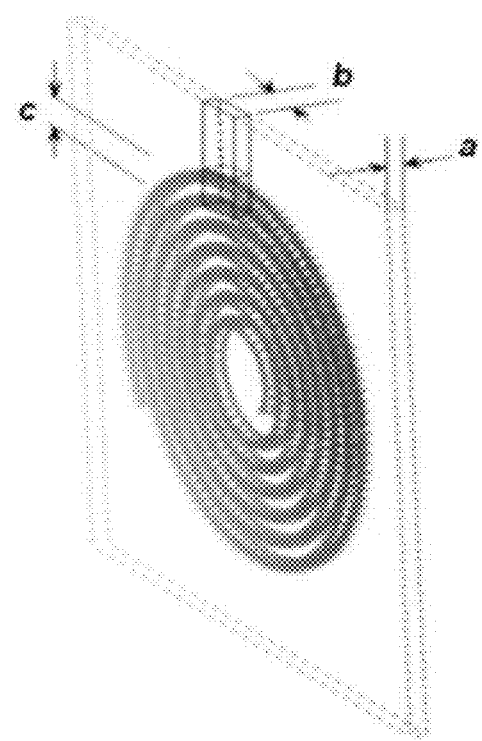
FIG. 10a illustrates schematically: (a) the cell parameters of the unit cell of the $TiO_{2-x}$ JT phase, where $0 \leq x \leq 1$ with tubular structure which is obtained from the synthesis procedure of the present invention.

In the present invention, the unit cell of $TiO_{2-x}$ JT, where $0 \le x \le 1$, (FIGS. 9a and 9b) represents the basic unit of construction of the plates and/or sheets that compose the nanotubes, nanofibers, nanowires, nanorods and/or nanoscrolls (FIGS. 8 and 10a).

The nanomaterials with the $TiO_{2-x}$ JT structure, where $0 \le x \le 1$, present a nanofibrilar morphology and/or a nanotubular morphology, which is constituted of piled structural layers that are rolled inwards (FIG. 8) into themselves. These layers present a great deficiency of oxygen and their basic structural unit, which is represented in FIGS. 9a and 9b, consist of two oxygen atoms per one of titanium in a basic cell that repeats thus forming the piled sheets that compose the nanotubes, nanofibers, nanowires, nanorods and/or nanoscrolls by rolling inwards into themselves. The unit cell of the structure $TiO_{2-x}$ JT, where $0 \le x \le 1$, presents an orthorhombic symmetry, which is described by several space groups (59 Pmmn, 63 Amma, 71 Immm, or 63 Bmmb) defined in the "International Tables for Crystallography" (International Tables for Crystallography Volumen A, Space-Group Symmetry. Theo Hahn, editor, Kluwer Academic Publisher: Netherlands, 1989). The atomic coordinates are presented in Table 9.

Figure 11A:
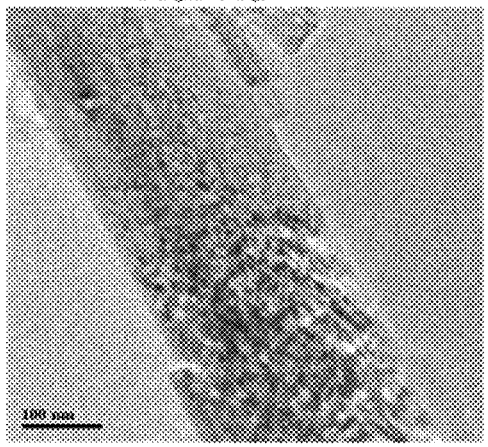
FIGS. 11a-11d show the following images.
Figure 11B:
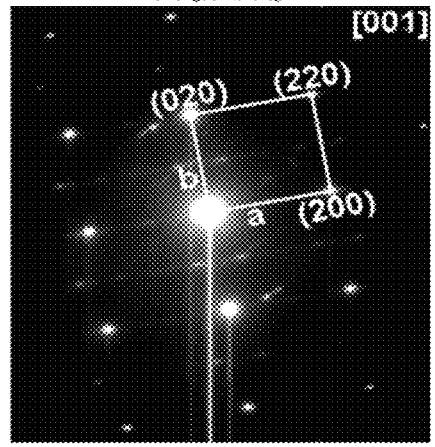
Figure 11C:
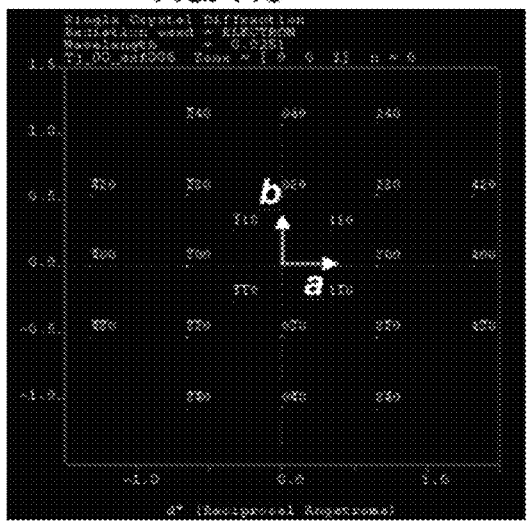
Figure 11D:
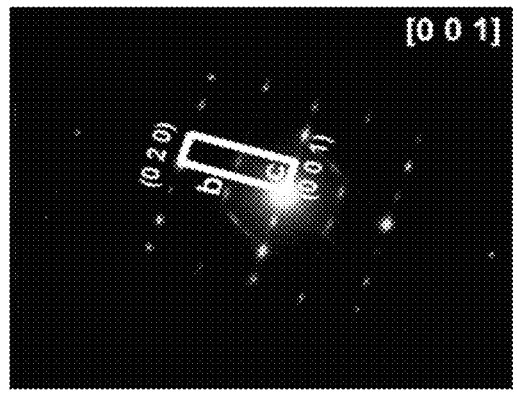

The cell parameters of the phase called in this invention as JT, whose cell parameters and relative atomic coordinates do not match with any of the known titania phases, were determined experimentally by characterization techniques such as: the transmission electron microscopy (TEM), see FIG. 11a. The electron diffraction patterns of isolated nanofibers, see FIG. 11b, were used to obtain the a and b cell parameters. The c parameter of the unit cell was obtained with high resolution transmission electron microscopy (HRTEM). An HRTEM image is presented in FIG. 12. The observed experimental cell parameters are a=0.317 nm, b=0.360 nm, and c=0.700 nm. The experimental results agree with the same results obtained by theoretical simulation (see Table 9). In FIG. 11c it is shown the theoretically calculated electron diffraction pattern, for the theoretical model of the JT phase, with orthorhombic structure that is presented in FIGS. 9a and 9b, and the theoretical pattern agrees well with the experimental electron diffraction pattern presented in FIG. 11b. From the experimental electron diffraction pattern presented in FIG. 11b it can be seen that the angle formed between the cell parameters a and b is equal to 90°. In FIG. 11d, which corresponds to an experimental electron diffraction pattern of a nanotube and where the reflections (001) and (020) are shown, it can be seen that the angle formed between the cell parameters b and c is equal to 90°. Thus the structure corresponds to a crystalline lattice which is orthorhombic and that has been confirmed by theoretical modeling using the structure presented in FIGS. 9a and 9b, whose cell parameters and angles agree with the experimental data (see Table 9). The positions of the atoms inside the orthorhombic lattice do not match with the position of the atoms in any known phase of titania.

The nanostructures and/or aggregates of nanotubes and nanofibers with the $TiO_{2-x}$ JT structure, where $0 \le x \le 1$, present the following characteristics: a pore diameter of 2 to 30 nm, 0.01 μm to 100 μm in length and an specific area of 5 to 500 $m^2/g$, preferably 100 to 400 $m^2/g$; depending on specific surface area of the titanate precursor used (hydrogen titanate and/or mixed sodium and hydrogen titanate).

The hydrogen titanate or titanium oxide hydrated and/or the mixed sodium and hydrogen titanate, with the general formula $HTiO_2$ and $Na_xH_{1-x}TiO_2$, where $0 \le x \le 1$; which are also aims of the present invention, have a structure with an orthorhombic symmetry similar to the structure $TiO_{2-x}$ JT phase, where $0 \le x \le 1$. The structure of these titanates is described by several space groups (59 Pmmn, 63 Amma, 71 Immm or 63 Bmmb) of the "International Tables for Crystallography" (International Tables for Crystallography Volumen A, Space-Group Symmetry. Theo Hahn, editor, Kluwer Academic Publisher: Netherlands, 1989) and their relative atomic coordinates are presented in Table 2, which correspond to the hydrogenated, hydrated, protonated and/or alkalinized phases. The calculated lattice parameters presented in Table 2 agree well with the observed experimental data. The a b c parameter of the titanates unit cell (hydrogen titanate and mixed sodium and hydrogen titanate), which are precursors of $TiO_{2-x}$ JT phase, were obtained with high resolution transmission electron microscopy (HRTEM). The observed experimental cell parameters for the hydrogen titanate and/or mixed sodium and hydrogen titanate are a=0.301 nm, b=0.378 nm, and c=0.735 nm. In general the lattice parameters in the hydrogen titanate and/or mixed sodium and hydrogen titanate are larger than the cell parameters of $TiO_{2-x}$ JT phase, where $0 \leq x \leq 1$. This is mainly due to the presence of the hydrogen and/or sodium atoms which are located in the inter-sheet spacing (see figures in Table 2).

The relative atomic coordinates vary depending on both the concentration of the alkaline metal in the mixed sodium and hydrogen titanate, and on the crystalline array (see Table 2); which in turn depend on the general synthesis conditions. The cell parameters of the unit cell of the orthorhombic structure, that conforms the nanotubes and/or nanofibers of the hydrogen titanates and/or the mixed sodium and hydrogen titanate, vary within the following interval: a from 0.263 nm to 0.331 nm; b from 0.332 nm to 0.448 nm, and c from 0.635 nm to 0.902 nm, for the case of the 59 Pmmn space group, and from 1.368 nm to 1.905, for the case of the 63 Amma, 71 Immm, and 63 Bmmb space groups; with $\alpha=\beta=\gamma=90°$. In the case of the 59 Pmmn space group the c parameter of the unit cell is akin to the spacing between the layers that constitute the walls of the nanotube and/or nanoscroll. For the case of the 63 Amma, 71 Immm, and 63 Bmmb space groups the interlayer spacing is related to the c cell parameter divided by two, because in these cases the unit cell is constituted by two layers (see Table 2). The interplanar space ranges from 0.635 to 0.902 nm for the case of the 59 Pmmn space group, and from 0.684 nm to 0.953, for the case of the 63 Amma, 71 Immm, or 63 Bmmb space groups; with $\alpha=\beta=\gamma=90°$.

Likewise, this invention is related with the procedure of synthesis of the titanate materials, which involves an alkaline treatment of the starting materials followed by a thermal treatment under either reflux conditions, at atmospheric pressure, or hydrothermal treatment, at autogenous pressure (in an interval of 1 to 150 atm), with continuous stirring between 10 and 1,000 rpm, preferably 100-500 rpm, to obtain the hydrogen titanate and/or the mixed sodium and hydrogen titanate. Finally, the titanates are submitted to a stage of thermal treatment in a controlled dynamic atmosphere composed of air, $O_2$, $N_2$, He, Ar or a mixture thereof at any concentration or in a controlled dynamic atmosphere composed of a mixture of inert gas and $H_2$ in a concentration of 5% or 30% by volume of $H_2$ based on the total volume of gas, preferably in a dynamic atmosphere of air or nitrogen at a temperature in the range of 200° C. and 500° C., preferably between 200° C. and 450° C.; most preferably between 200° C. and 400° C. to thus obtain the titanium oxide material with the structure (JT), which is an aim or an object of the present invention.

The method to obtain nanomaterials such as nanofibers, nanowires, nanorods, nanoscrolls and/or nanotubes of $TiO_{2-x}$ JT phase, where $0 \leq x \leq 1$, produces a nanomaterial with high specific area, in an interval of 5 to 500 $m^2/g$.

Initially, the process comprises treatment of a titanium compound such as: titanium oxide with a crystalline structure of the anatase type, amorphous titanium oxyhydroxide and/or amorphous titanium hydroxide, titanium oxide with a crystalline structure rutile type and/or directly from the mineral called rutile and/or ilmenite; with an alkaline solution in a concentration inside the range of 1 to 50 M, preferably of 5 to 20 M, of sodium hydroxide or sodium carbonate, potassium hydroxide or ammonium hydroxide; preferably of sodium hydroxide or potassium hydroxide. The $NaOH/TiO_2$ molar ratio used is in the range of 7 to 70 M, preferably 10 to 60 M, which includes a ratio $H_2O/TiO_2$ of 50 to 410 M, preferably 80 to 300 M.

The resulting suspension can be subjected to a treatment under hydrothermal conditions in a closed system without stirring or with continuous stirring between 10 and 1,000 rpm, preferably 100-500 rpm at a temperature in the range of 50° C. to 180° C., preferably between 80° C. and 160° C. under autogenous pressure in a range of 1 to 150 atm during a time range of 1 to 100 hours, preferably of 1 to 80 hours. Alternatively, the first formed suspension may be subjected to a thermal treatment under reflux conditions at atmospheric pressure without or with continuous stirring between 10 and 1,000 rpm, preferably 100-500 rpm; at a temperature in the range of 50° C. to 150° C., preferably in the range of 80° C. to 120° C.; during a period of time in the range of 1 to 100 hours, preferably in the range of 1 to 80 hours.

Next, the resulting materials are subjected to a treatment of ionic exchange with a diluted acid solution with a concentration in the range of 0.1 and 1 M in aqueous media, and using acids such as the following: chlorhidric acid, sulfuric acid, nitric acid, fluoric acid, boric acid and/or phosphoric acid, or ammonium chloride, ammonium carbonate, or any ammonium salt capable of exchanging sodium; preferably a solution of chlorhidric acid or nitric acid; until the pH of the suspension is reduced to a value between 1 and 7, preferably 2 and 4. Then, the suspension is aged for an interval of time between 1 to 24 hours, preferably 3 to 18 hours; at room temperature, approximately 20° C. Once the aging process is finished, the suspension is separated by a filtration procedure; the obtained solid is washed with sufficient deionized water and it is dried in a stove with a temperature in the range of 60° C. to 120° C., preferably between 80° C. and 110° C., during a time period of 4 to 24 hours, preferably 12 to 18 hours.

The ionic exchange treatments can also be done directly by several successive washings with water or with alcohol (ethanol, n-propanol, i-propanol, n-butanol, etc) or with mixtures of alcohol-water in any proportion. Depending on the extent of the washing and/or the decrease on the pH of the suspension, the hydrogen titanates and/or the mixed sodium and hydrogen titanates, which are aims of the present invention, are produced.

The hydrogen titanates and/or the mixed sodium and hydrogen titanates, which are the precursors of the $TiO_{2-x}$ JT phase, where $0 \leq x \leq 1$, and aims of the present invention, present: disordered mesoporosity, average pore diameter in the range of 3 to 25 nm, and a specific area in the range of 100 to 600 $m^2/g$.

The specific area of the hydrogen titanates and/or the mixed sodium and hydrogen titanates, depends on their radial and longitudinal dimensions; the general synthesis conditions during the hydrothermal treatment or the thermal treatment under reflux conditions; and on the prevailing conditions during the ionic exchange treatment.

With the same titanium compound, such as the $TiO_2$ with anatase structure, and at constant hydrothermal reaction time and in a closed system, the synthesis carried out at reaction temperatures lower than 150° C. (with a concentrated solution of an alkaline metal hydroxide and/or an alkaline metal carbonate in the range of 1 to 50 M, preferably from 5 to 20M) produces small nanofibers and/or nanotubes with a piling level of 1 to 10 layers. The longitude of the nanofibers and/or nanotubes vary between 0.1 and 1 μm. Whereas the synthesis carried out at a temperature between 150° C. and 180° C. produce nanofibers and/or nanotubes of higher dimensions, with piling levels between 10 to 50 layers and a length between 1 and 50 μm.

Another parameter controlling nanofiber and/or nanotubes growth of the hydrogen titanates and/or the mixed sodium and hydrogen titanates, which are the precursors of the $TiO_{2-x}$ JT phase, where $0 \leq x \leq 1$, and that are aims of the present invention, is the crystal size (size of crystallites) of the starting material, and the average particle diameter of particles composed of starting material crystallite aggregates, used in the synthesis of the titanates. The average particle diameter used is in the range of 2.5 to 8 μm (2500 nm to 8000 nm). At a same reaction temperature and at same reaction timing for the hydrothermal reaction and or thermal reaction under reflux conditions, large crystalline aggregates of the starting material produce nanofibers and/or nanotubes of small dimensions, with piling levels of 1 to 10 structural layers and a length between 0.1 and 5 μm.

A titanium starting material with small average particle diameter (<1 μm) and/or with a small crystal size, such as between 3 and 10 nm, preferably 5 to 10 nm for anatase, produces large, stable (at room temperature) nanofibers and/or nanotubes of hydrogen titanate and/or mixed sodium and hydrogen titanates with lengths ranging from 1 to 10 μm, and a piling level of 1 to 10 structural layers. According to the present invention, an anatase precursor crystal size of between 5 and 10 nm is used in order to reach its complete transformation into nanotubes and/or nanofibers with dimensions in the nanoscale region, which exhibit high specific surface area, and have a chemical composition of hydrogen titanate or mixed sodium and hydrogen titanate but not anatase or brookite. If amorphous titania is used to form the titanate, a crystal size of 0.1 nm to 5 nm, preferably 1 to 3 nm may be used.

Another parameter ruling the growth of the nanofibers and/or nanotubes of the hydrogen titanates and/or the mixed sodium and hydrogen titanates, which are the precursors of the $TiO_{2-x}$ JT phase, where $0 \leq x \leq 1$, and that are aims of the present invention, is the time of the thermal reaction at reflux or hydrothermal conditions. Using the same raw starting material, a reaction time lower to 6 hours produces small nanofibers and/or nanotubes with a length between 50 to 500 nm, with staking levels from 2 to 5 layers, while a reaction time between 7 and 72 hours produces a nanofibers and/or nanotubes growth of 0.1 to 10 μm in length, and with staking levels from 1 to 10 layers.

The control of dimensions of the hydrogen titanate and/or the mixed sodium and hydrogen titanate is important, due to the fact that they control the dimensions of the $TiO_{2-x}$ JT phase, where $0 \leq x \leq 1$, of the present invention.

The hydrogen titanates and/or the mixed sodium and hydrogen titanates synthesized are subjected to a dynamic thermal treatment stage in an oxidizing, or reducing, or inert controlled atmosphere composed of air, $O_2$, $N_2$, He, Ar, or a mixture of them in any concentration, or in a controlled dynamic atmosphere composed of a mixture of inert gas and $H_2$ in a concentration of 5% or 30% by volume of $H_2$ based on the total volume of gas, preferably in an oxidizing or inert atmosphere such as air or nitrogen; in a dynamic flow of such gas, at a temperature between 200° C. and 500° C., preferably between 200° C. or 300° C. and 450° C.; most preferably between 200° C. and 400° C., at a suitable flowing gas rate, such as between 0.1 to 1.0 liter per minute, preferably a flowing gas rate of 0.3 to 0.5 liter per minute to obtain and stabilize the $TiO_{2-x}$ JT phase, where $0 \leq x \leq 1$, and maintain the nanotubular morphology and/or nanofibrilar morphology of the titanate precursor.

The surface area exposed by such titanate nanotubes generally drops when calcined up to 300° C. when the calcination is carried out under a steady, non-dynamic, air atmosphere by placing the titanate nanotubes in an oven, and the nanotubes collapse to form nanoparticles of anatase. The dynamic heating method of the present invention provides a thermal treatment methodology which avoids the sintering of the nanotubes, while keeping their nanotubular morphology and high surface area after calcination even at 400° C. The nanotubular structure is stabilized after the dynamic thermal treatment through the formation of the layered structure of the JT phase.

Figure 13:
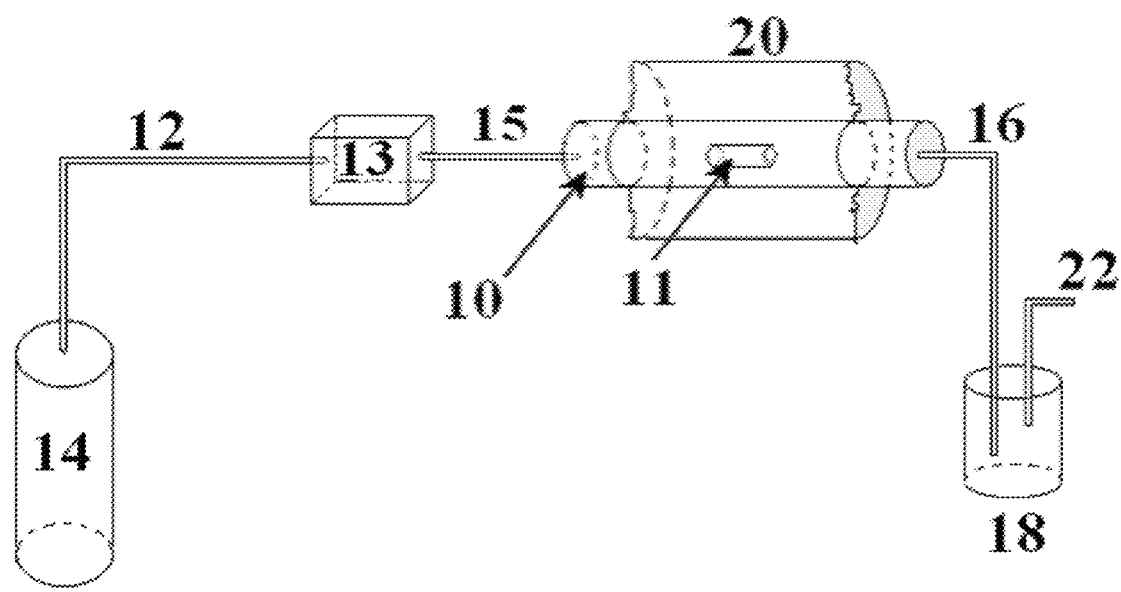
FIG. 13 illustrates a dynamic heating system for forming the nanomaterial $TiO_{2-x}$ JT phase, where $0 \le x \le 1$, starting from the dynamic thermal treatment of the hydrogen titanates and/or the mixed sodium and hydrogen titanates of the present invention.

The dynamic thermal treatment may be conducted, for example, in a sealed, tubular chamber 10, which is shown in FIG. 13, which may comprise a tube of quartz or sintered silica in which a sample 11 of the titanate nanotubes is placed and then sealed. Chamber 10 is connected by conduit 12, a mass flow controller 13, and conduit 15 to tank 14 which contains an oxidative gas, inert gas, or reducing gas supply. Conduit 16 connects chamber 10 to water trap 18. Chamber 10 is surrounded by electric heater 20. Dynamic flow during heating of the titanates is ensured by observing bubbles in the water trap 18, which releases the gas via conduit 22.

The titanate nanotube sample 11 is heated to a temperature of 120° C. at a heating rate between 0.5° C. to 20° C./min, preferably between 1 to 10° C./min. The sample remains at this temperature between 0.5 to 5 hours, in order to slowly eliminate the absorbed water. Thereafter, the temperature may be increased, for example, up to 400° C., at the same heating rate. The sample remains at this temperature for between 1 to 24 hours, preferably between 2 and 10 hours. The samples are heated under a dynamic flow of an inert or oxidizing gas, such as a gaseous flow of air, oxygen, nitrogen, helium, or argon, or any mixture of such gases in any concentration or in a controlled dynamic atmosphere composed of a mixture of inert gas and $H_2$ in a concentration of, for example, 5 to 30 volume percent of $H_2$ based on the total gas mixture. Preferably, air, nitrogen or helium is used.

The dynamic thermal treatment, under controlled atmosphere converts the hydrogen titanate and/or the mixed sodium and hydrogen titanate into the $TiO_{2-x}$ JT phase, where $0 \leq x \leq 1$; which maintains a unit cell with orthorhombic symmetry, that is described by the different space groups contained in Table 9, according to the space groups description in the "International Tables for Crystallography" (International Tables for Crystallography Volumen A, Space-Group Symmetry. Theo Hahn, editor, Kluwer Academic Publisher: Netherlands, 1989). The cell parameters of the unit cell vary within the following intervals: a from 0.283 to 0.324 nm, b from 0.354 to 0.395 nm and c from 0.695 to 0.735 nm, for the case of the 59 Pmmn space group, and from 1.408 nm to 1.453, for the case of the 63 Amma, 71 Immm, and 63 Bmmb space groups; with $\alpha = \beta = \gamma = 90°$ (see Table 9); depending on the synthesis general conditions. Likewise, the resulting material has a pore diameter in the interval of 3 to 50 nm and a specific area of 5 to 500 m$^2$/g, preferably from 100 to 400 m$^2$/g; and it is characterized by tubular structures and/or fibrilar structures with a length between 0.1 μm and 100 μm.

The textural properties, namely, the surface area, pore volume and pore diameter, of the nanostructures of $TiO_{2-x}$ JT phase, where $0 \leq x \leq 1$, decrease as the temperature of the thermal treatment increases under controlled dynamic atmosphere; however, the observed nitrogen adsorption and desorption isotherm is characteristic of the mesoporous nature of the nanotubes, which is confirmed through transmission electron microscopy as it is shown in FIGS. 3d, 3e and 3f.

Figure 1A:
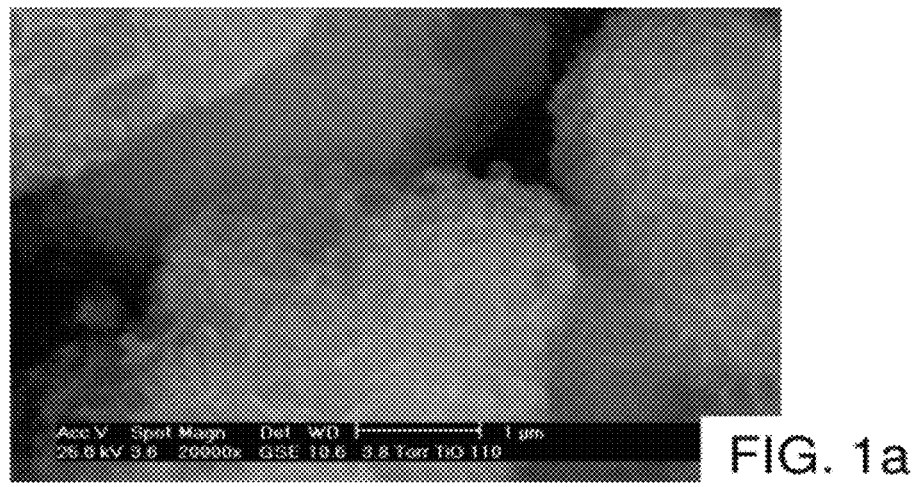
Figure 1B:
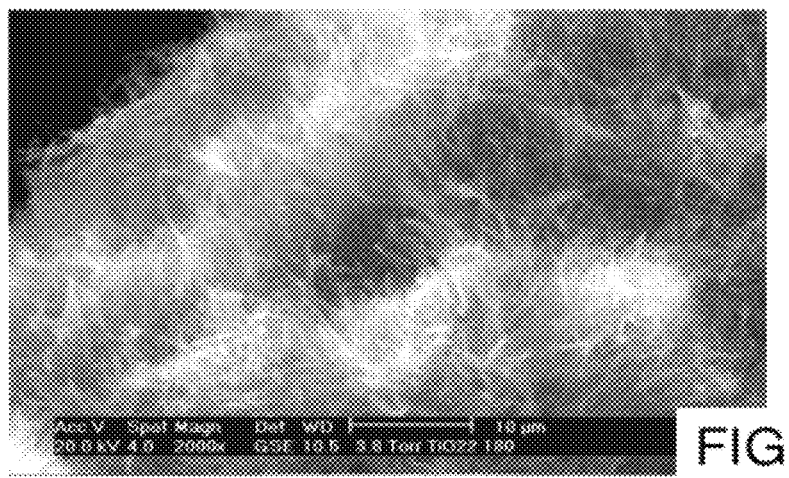
Figure 1C:
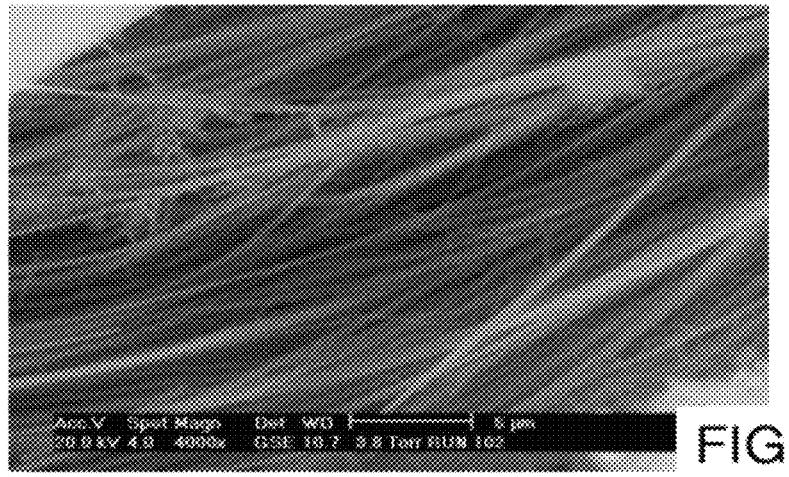

In FIGS. 1a-1c, the images from scanning electron microscopy (SEM) are presented and where it is observed the nanofibrilar and/or nanotubular morphology of the hydrogen titanate, of the mixed sodium and hydrogen titanate and of the $TiO_{2-x}$ JT phase, where x The length of the fibers and/or tubes depends on the temperature of the hydrothermal or thermal treatment reflux conditions; the higher the temperature the higher the dimension of the fibers and/or tubes. FIG. 1a shows aggregates of nanofibers and/or nanotubes of the hydrogen titanate and/or the mixed sodium and hydrogen titanate, which were obtained at low temperature, from 50° C. to 130° C. FIG. 1b presents nanofibers and/or nanotubes with dimensions between 1 and 50 µm, which were obtained at temperatures between 130° C. and 160° C. FIG. 1c displays the fibrilar and/or tubular morphology of the $TiO_{2-x}$ JT phase, where $0 \leq x \leq 1$, obtained by the dynamic thermal treatment, between 300 and 500° C. and in controlled dynamic atmosphere, of the hydrogen titanates and/or mixed sodium and hydrogen titanates synthesized between 160 and 180° C. As it is observed, the fibrilar morphology is kept.

Figure 2A:
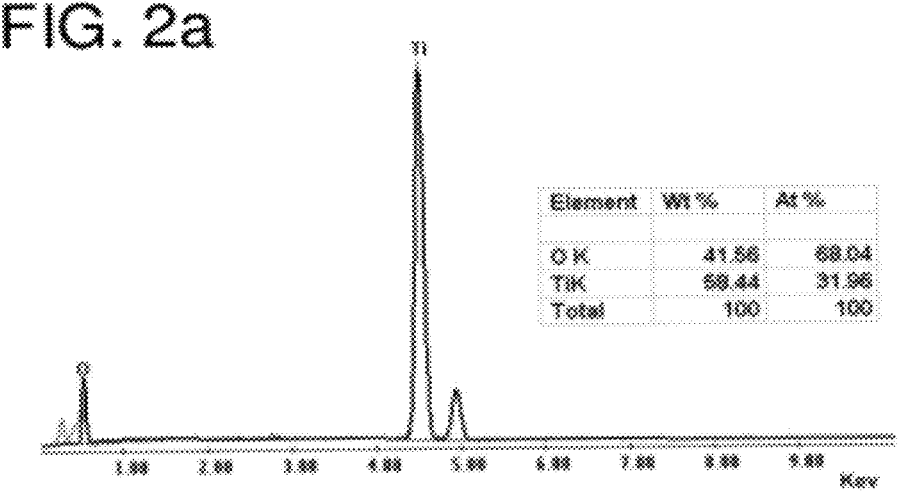
FIGS. 2a, 2b and 2c are X-ray dispersive energy spectra (EDX) which show the quantitative chemical composition of the nanotubes and/or nanofibers, a) hydrogen titanate, b) mixed sodium and hydrogen titanate and c) $TiO_{2-x}$ JT phase, where $0 \leq x \leq 1$, respectively.
Figure 2B:
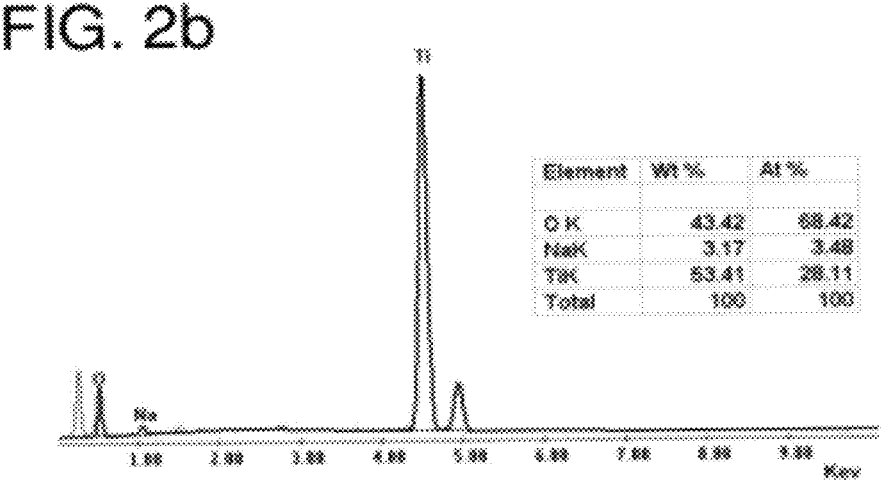
Figure 2C:
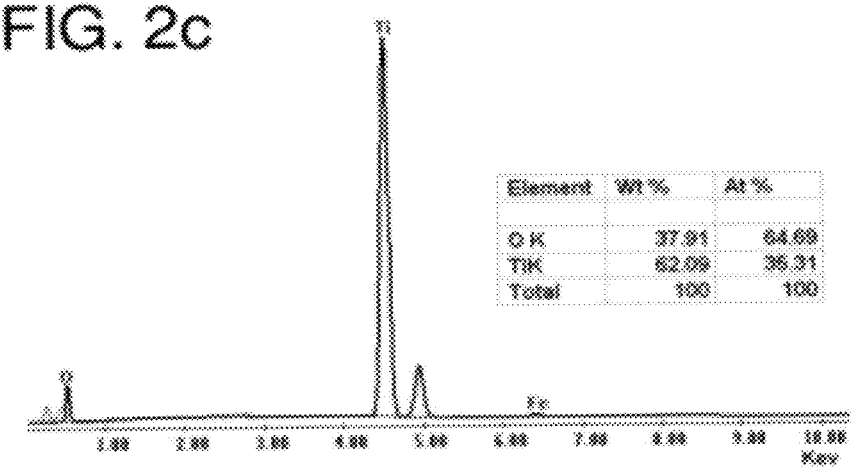

In FIGS. 2a-2c, the X-ray dispersive energy spectra (EDX) are presented. In FIG. 2a, it is observed that the spectrum of the materials that were not submitted to thermal treatment is basically composed of Ti and O, with an O/Ti atomic ratio between 2.0 and 2.8, which suggests the presence of a hydrogen titanate. Likewise, in FIG. 2b, the spectrum of the mixed sodium and hydrogen titanate material indicates that its composition is Ti, O and Na, with an O/Ti atomic ratio between 2.0 and 2.8. In FIG. 2c, the spectrum of the materials which were thermally treated in a dynamic oxidizing or reducing or inert atmosphere is shown. It is observed that the chemical composition is Ti and O, with an O/Ti atomic ratio between 1 and 1.9, which indicates a high oxygen deficiency.

In FIGS. 3a-3f, the transmission electron microscopy is shown, where FIGS. 3a, 3b and 3c correspond to nanotubes and/or nanofibers of hydrogen titanates and/or mixed sodium and hydrogen titanates and FIGS. 3d, 3e and 3f correspond to nanotubes and/or nanofibers of $TiO_{2-x}$ JT phase, where $0 \leq x \leq 1$. In FIGS. 3a and 3d, it is observed that both materials basically have nanotubular and/or nanofibrilar structures with a length of several micrometers, between 0.01 and 1 µm, and they have diameters between 2 nm and 15 nm and between 3 and 10 nm for the titanates (hydrogen and/or mixed sodium and hydrogen titanate) and the $TiO_{2-x}$ JT phase, where $0 \leq x \leq 1$, respectively. The nanotubes are generally opened at the ends.

FIGS. 3b and 3e present the hollow transversal section of the nanotubes displaying an open internal spacing with diameters between 5 and 15 nm. In FIG. 3c, it is shown that the walls of the nanotubes of hydrogen titanate and/or mixed sodium and hydrogen titanate are composed of approximately 1 to 5 structural layers. In FIG. 3f, it is observed that the nanotubes of the $TiO_{2-x}$ JT phase, where $0 \leq x \leq 1$, are as well composed of 1 to 5 structural layers.

By comparing the images corresponding to the hydrogen titanate and the mixed sodium and hydrogen titanate with the ones corresponding to the $TiO_{2-x}$ JT phase, where $0 \leq x \leq 1$ (FIGS. 3a-3f) it is established that even after a dynamic thermal treatment in controlled atmosphere, at a temperature between 300° C. and 500° C.; the fibrilar morphology and/or nanotubular morphology of the materials is kept. Thus proving that the nanotubular and/or nanofibrilar structure obtained through the procedure, aim of the present invention, is thermally stable, keeping its high specific area.

Figure 4:
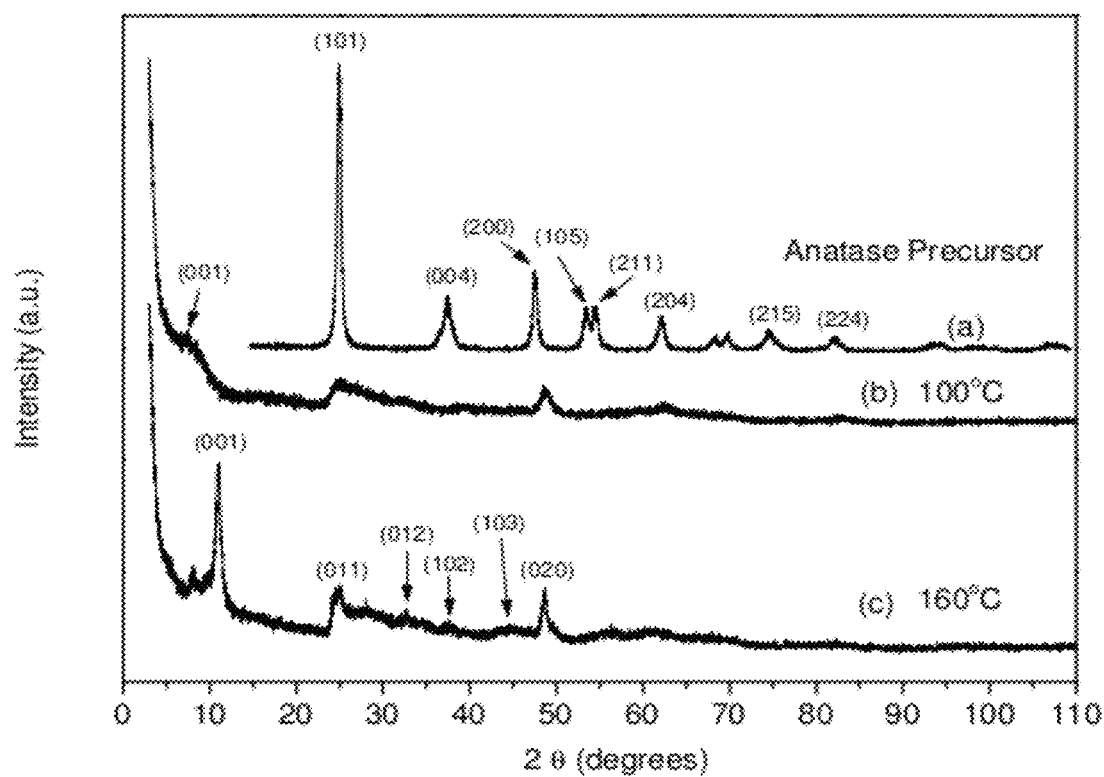
FIG. 4 shows the X-ray diffraction patterns: (a) titanium compound, meaning $TiO_2$ with anatase structure or phase; (b) and (c) hydrogen titanates and mixed sodium and hydrogen titanates synthesized at 100° C. (b) and at 160° C. (c), respectively; which are precursors of the $TiO_{2-x}$ JT phase, where $0 \leq x \leq 1$.

In FIG. 4, the X-ray diffraction patterns of the nanofibers, nanotubes, nanoscrolls, nanorods, nanowires and/or microfibers are displayed, which correspond to the hydrogen titanate and/or mixed sodium and hydrogen titanate obtained under the preferred modalities of the present invention at two temperatures of synthesis. The intensity and the position of the diffraction signal corresponding to the crystalline surface (001) vary depending on the size of the fibers and/or tubes. The spectrum label as (c) in FIG. 4 corresponds to an X-ray diffraction pattern of big fibers obtained at high temperature (160° C.), while the spectrum label as (b) in FIG. 4 corresponds to an X-ray diffraction pattern of small fibers obtained at low temperature (100° C.). The signals are broaden and less defined as the diameter and length of fibers decrease. Also in FIG. 4, the X-ray diffraction pattern of a titanium compound used for the synthesis, meaning $TiO_2$ with anatase structure, is shown in the spectrum label as (a), with the aim of illustrating the structural changes that take place during the hydrothermal synthesis or thermal synthesis with reflux according with the procedure which is aim of the present invention. It is clear from these X-ray diffraction patterns that the phase of the titanates is not anatase.

Figure 5:
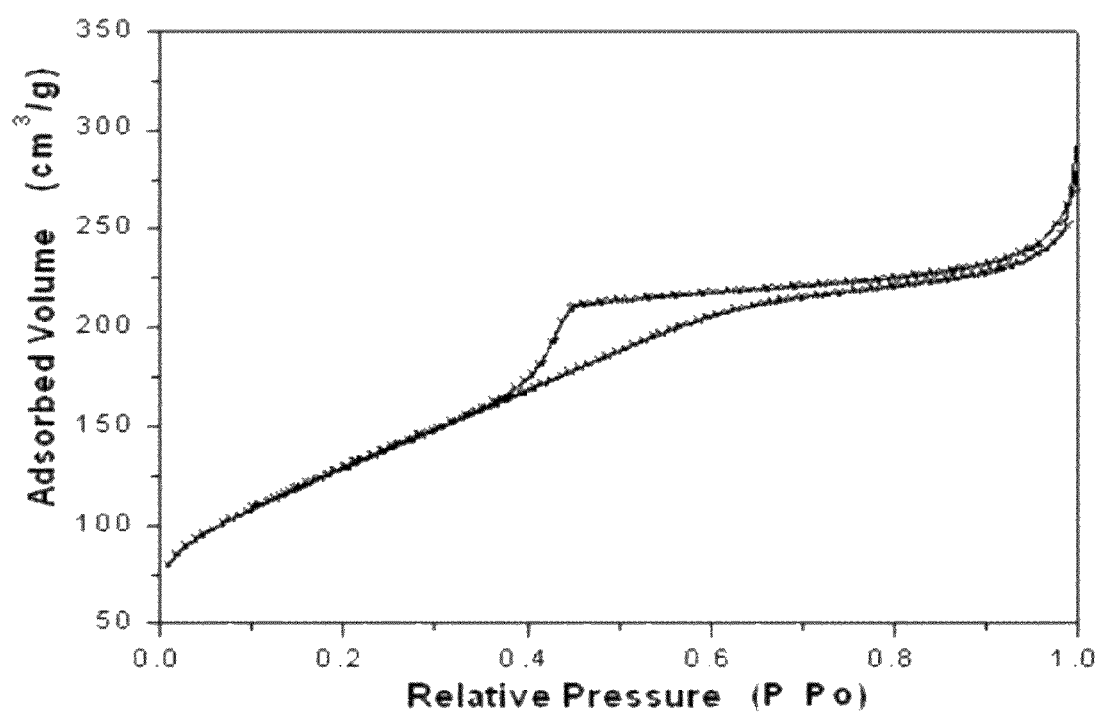
FIG. 5 shows the characteristic nitrogen adsorption isotherm obtained for the hydrogen titanate nanomaterials, for the mixed sodium and hydrogen titanate and for the $TiO_{2-x}$ JT phase, where $0 \leq x \leq 1$.

In FIG. 5, it can be seen that the nanostructures, nanofibers and/or nanotubes present a type IV isotherm (classification of the International Union of Pure and Applied Chemistry (IUPAC)), a histeresis is observed at a relative pressure (P/Po) of 0.4-0.6, indicating the existence of mesoporous nanostructures. The isotherm presented in this Figure is characteristic of both the hydrogen titanate and/or mixed sodium and hydrogen titanate and the $TiO_{2-x}$ JT phase, where $0 \leq x \leq 1$. Through the application of the BET method (Brunauer Emmett Teller) it was determined that the nanotubes and/or nanofibers of both the titanates (hydrogen titanate and/or mixed sodium and hydrogen titanate) and $TiO_{2-x}$ JT phase, where $0 \leq x \leq 1$, display a specific area between 100 and 500 m$^2$/g, which indicates that the obtained titanates (hydrogen titanate and/or mixed sodium and hydrogen titanate) of the present invention maintain their nanotubular structure and therefore their mesoporosity and high specific area when are submitted to a dynamic thermal treatment in an atmosphere that can be oxidative, reductive or inert.

Figure 6:
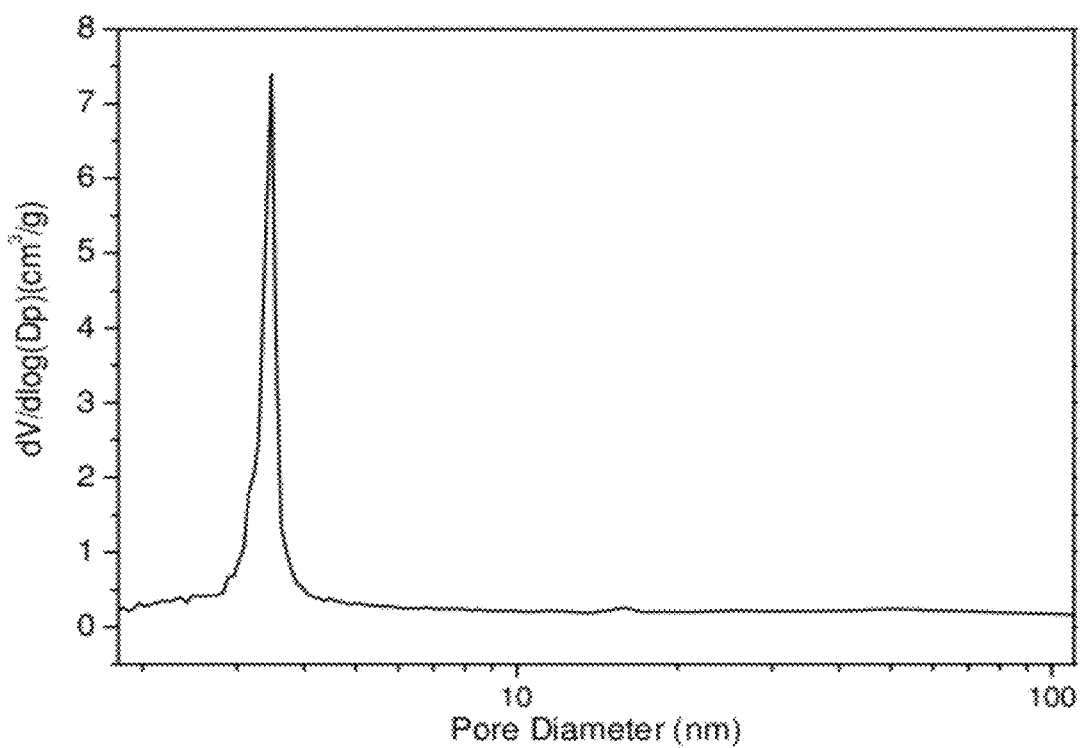
FIG. 6 shows the characteristic pores distribution of the hydrogen titanate nanostructures, of the mixed sodium and hydrogen titanate and of the $TiO_{2-x}$ JT phase, where $0 \leq x \leq 1$.

In FIG. 6, it is observed the porous distribution obtained from the application of the BJH mathematic model (Barrer Joyner Halenda) to the desorption isotherms shown in FIG. 5, from which it is possible to determine that the nanomaterials present a very homogeneous distribution of the pore size and in the range of 3 and 4 nm. The pore size distribution is associated to the internal diameter of the nanofibers and/or nanotubes, it was also determined in the transmission electron microscopy studies. Besides the nanomaterials, aims of the present invention, present a high pore volume, with a value between 0.3 and 1.5 cm$^3$/g.

Figure 7:
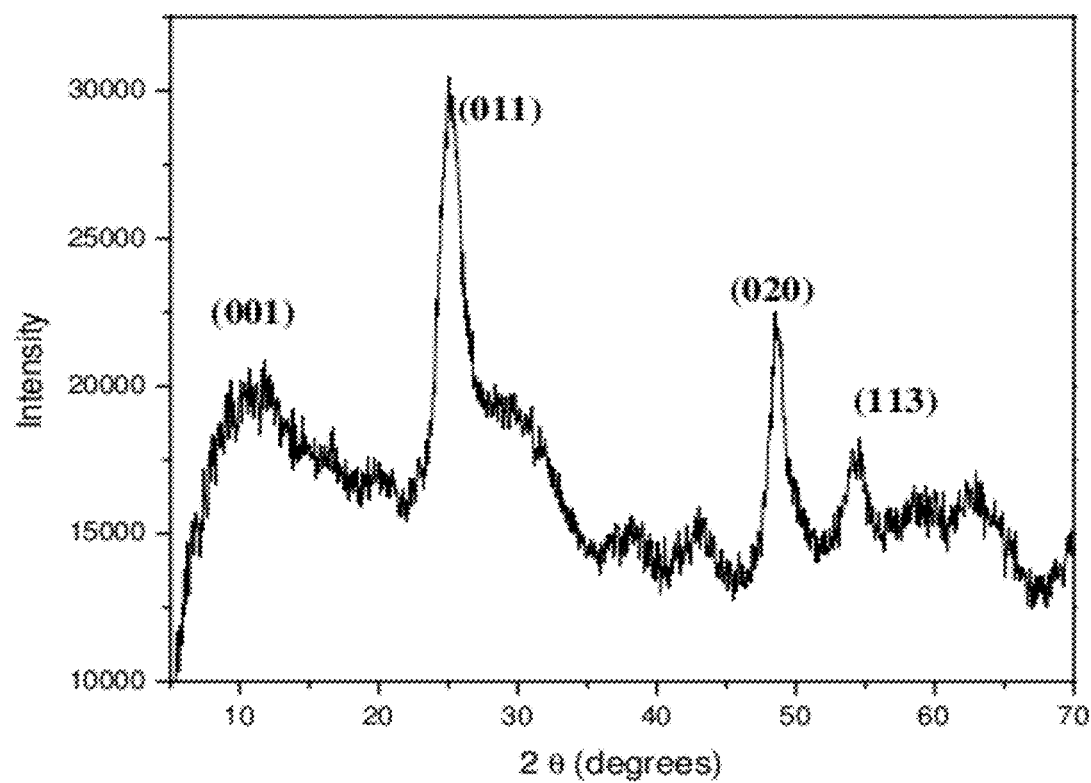
FIG. 7 shows the X-ray diffraction pattern of the $TiO_{2-x}$ JT phase, where $0 \leq x \leq 1$, which is object of the present invention.

FIG. 7 shows the X-ray diffraction pattern characteristic of the orthorhombic $TiO_{2-x}$ JT structure, where $0 \leq x \leq 1$, that comes from the hydrogen titanate and/or the mixed sodium and hydrogen titanate submitted to thermal treatment at a temperature between 300° C. and 500° C. and under a dynamic oxidizing, or reducing, or inert atmosphere.

FIG. 8 shows a schematic model of the nanotubes and/or nanoscrolls formation, which consists in the rolling and/or folding of laminar nanostructures having an overlapping of semitubular and semicircular structures. It is believed that this mechanism illustrates the formation of the nanotubes of hydrogen titanates and/or mixed sodium and hydrogen titanates, which occurs during the procedure according to the present invention.

FIGS. 9a and 9b present the unit cell of the structure $TiO_{2-x}$ JT, where $0 \leq x \leq 1$, constituted of oxygen and titanium, with orthorhombic symmetry that constitutes the basic unit of construction of the layers and/or sheets that roll and/or fold to form the nanotubes and/or nanoscrolls, by means of the mechanism illustrated in FIG. 8. FIG. 9a shows a tridimensional view of the unitary cell and FIG. 9b shows a bidimensional view along the a,b crystalline plane.

Figure 10B:
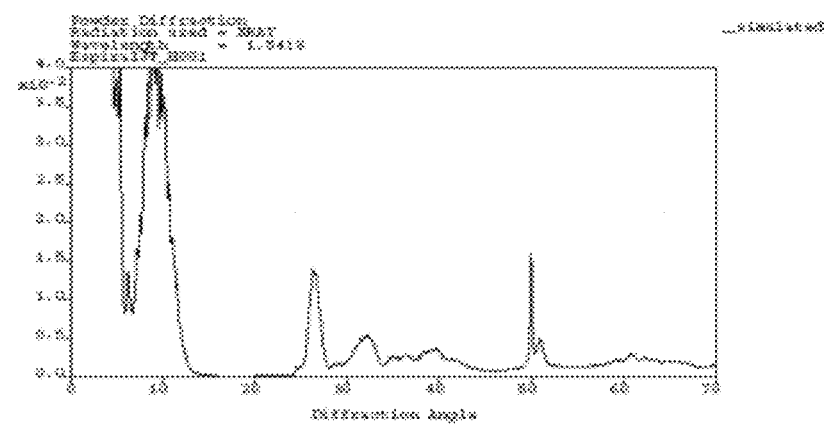
FIGS. 10b and 10c, respectively, present the X-ray diffraction patterns simulated for the model presented in FIG. 10(a) and for the structures shown in Tables 2 and 9 of the titanates (hydrogen titanate and/or mixed sodium and hydrogen titanate), and of $TiO_{2-x}$ JT phase, where $0 \leq x \leq 1$, respectively.
Figure 10C:
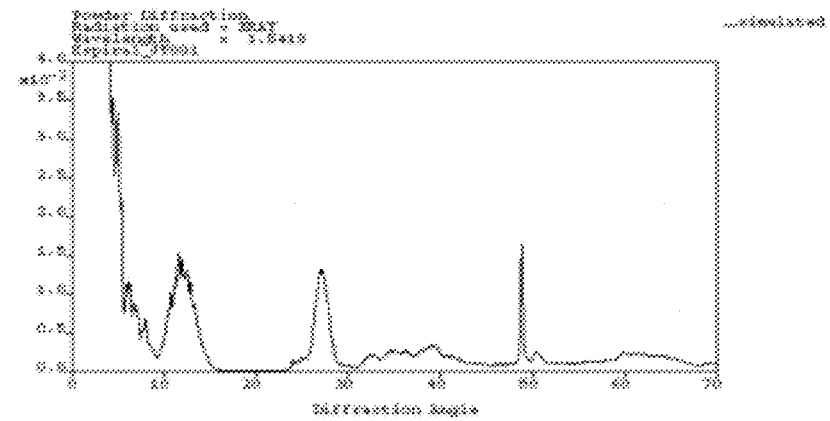

In FIG. 10a, a nanotube and/or nanoscroll is presented and built with the unit cell of $TiO_{2-x}$ JT phase, where $0 \leq x \leq 1$, presented in FIGS. 9a and 9b; by following the formation model mechanism of nanotubes and nanoscrolls presented in FIG. 8. Also schematically illustrated is the spatial position of the unit cell and its cell parameters in the nanotubes or nanoscrolls. In the case of the 59 Pmmn space group the c parameter of the unit cell is akin to the spacing between the layers that constitute the walls of the nanotube and/or nanoscroll. For the case of the 63 Amma, 71 Immm, and 63 Bmmb space groups the interlayer spacing is related to the c cell parameter divided by two, because in these cases the unit cell is constituted by two layers (see Table 9). FIGS. 10b and 10c present the X-ray diffraction patterns simulated for the model presented in the FIG. 10a and for the structures shown in the Tables 2 and 9, respectively, which are characteristic of the nanotubes and/or nanofibers of the hydrogen titanates and/or of the mixed sodium and hydrogen titanates as well as of the $TiO_{2-x}$ JT phase, where $0 \leq x \leq 1$.

In FIGS. 11a-11d, the following images are shown: 11a— transmission electron microscopy (TEM) image, which presents the morphology of the nanotubes of $TiO_{2-x}$ JT phase, where $0 \leq x \leq 1$; 11b—experimental electron diffraction pattern of the nanotube or nanofiber presented in FIG. 11a; 11c shows the simulated electron diffraction pattern for the theoretical model of the unit cell of the $TiO_{2-x}$ JT phase, where $0 \leq x \leq 1$, that is presented in FIGS. 9a and 9b and that has to be compared with 11b. The (200) reflection is associated with the a cell parameter of the unit cell and it has a value in the range of 0.283 nm and 0.324 nm. The (020) reflection is associated with the b cell parameter of the unit cell and it has a value in the range of 0.354 and 0.395 nm. In addition, it is also observed that the nanofibers and/or nanotubes preferably grow in the b axis direction (see FIG. 10a). 11d shows the experimental electron diffraction pattern of a nanotube where the reflections (001) and (020) associated with cell parameters c and b respectively are shown, as well as the angle formed.

Figure 12:
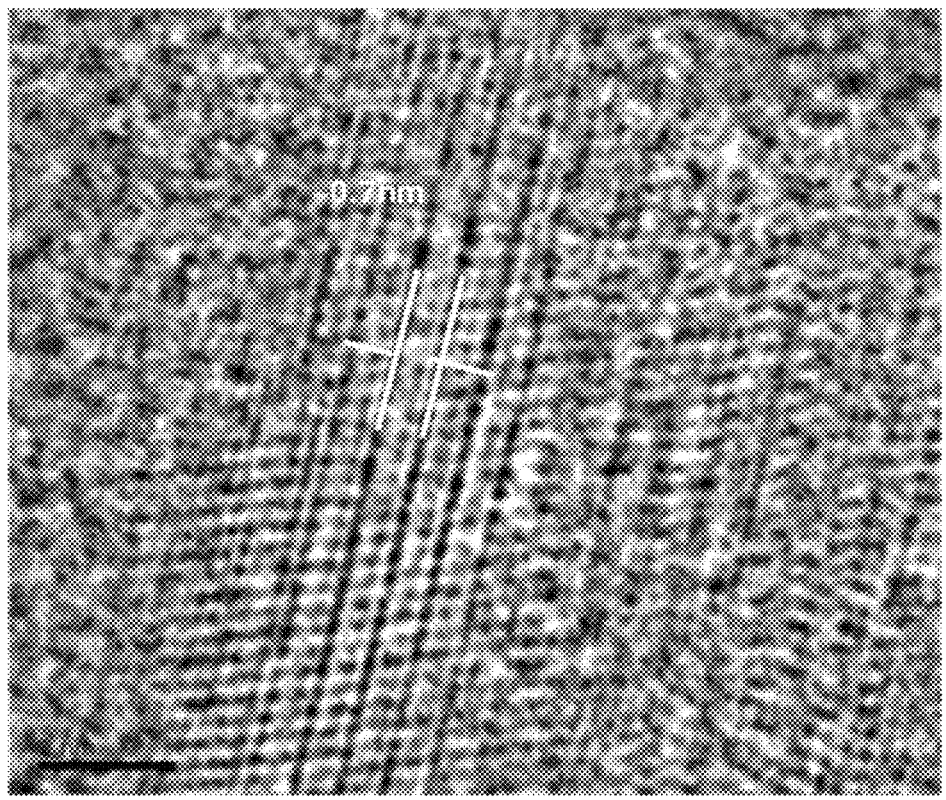
FIG. 12 shows a high resolution transmission electron microscopy (HRTEM) of a fiber and/or tube where an interplanar spacing of approximately 0.7 nm is observed and it is associated with the c cell parameter of the orthorhombic unit cell of the $TiO_{2-x}$ JT phase, where $0 \le x \le 1$.

FIG. 12 shows a high resolution transmission electron microscopy (HRTEM) of a fiber and/or tube where an interplanar spacing of approximately 0.7 nm is observed, and that corresponds to the crystalline plane (001) of the structure of $TiO_{2-x}$ JT phase, where $0 \leq x \leq 1$. In the case of the 59 Pmmn space group the c parameter of the unit cell is akin to the spacing between the layers that constitute the walls of the nanotube and/or nanoscroll. For the case of the 63 Amma, 71 Immm, and 63 Bmmb space groups the interlayer spacing is related to the c cell parameter divided by two, because in these cases the unit cell is constituted by two layers (see Table 9). The interplanar space ranges from 0.695 to 0.735 nm for the case of the 59 Pmmn space group, and from 0.704 nm to 0.727, for the case of the 63 Amma, 71 Immm, or 63 Bmmb space groups; with $\alpha = \beta = \gamma = 90°$.

EXAMPLES

The following examples show production of titanium oxide nanomaterials with the crystalline structure $TiO_{2-x}$ JT phase, where $0 \leq x \leq 1$, that are thermally stable and that are produced from a precursor of hydrogen titanate and/or mixed sodium and hydrogen titanate with orthorhombic structure with our synthesis procedure. The molar ration $NaOH/TiO_2$ used is in the range of 7 to 70 M, preferably 10 to 60 M, which includes a ratio $H_2O/TiO_2$ of 50 to 410 M, preferably 80 to 300 M. The examples are illustrative of the present invention, and are not intended to limit the scope of the invention.

Examples 1 to 7

Examples 1 to 7 illustrate the preparation of the nanotubes of hydrogen titanate and/or mixed sodium and hydrogen titanate which are isostructural to the structure $TiO_{2-x}$ JT phase, where $0 \leq x \leq 1$, starting from titanium oxihydroxide (with a crystal size smaller than 3 nm, a specific area of 190 $m^2/g$, a pore volume of 0.22 $cm^3/g$, and an average pore diameter of 4.7 nm), prepared by the sol-gel method and under the synthesis modality involving a hydrothermal treatment, aim of the present invention.

1.5 g of amorphous titanium oxihydroxide, obtained by the sol-gel method, is placed in contact with 100 $cm^3$ of a 5 to 20 M alkaline solution of sodium hydroxide. Each of the prepared suspensions in examples 1 to 7 was poured in a closed vessel. In Table 1, the different temperatures used in the synthesis for each example are specified, within an interval from 100° C. to 180° C., and during a reaction time between 12 and 96 hours.

The resulting materials from each example is submitted to a ionic exchange treatment that involves a washing process with a 1M solution of chlorhidric acid until the pH of the suspension lowers to a value between 1 and 7, then all the solutions are aged for a period of time ranging from 12 to 18 hours. After the aging, each suspension is filtered; then the thus obtained solids are washed with abundant deionized water and dried at 110° C.

As it can be seen in FIGS. 1(a) and 1(b), the materials obtained are basically constituted of nanofibers and/or nanotubes and/or aggregates of nanofibers and/or nanotubes. In FIG. 4, lines (b) and (c), it can be observed that the X-ray diffraction patterns correspond to a hydrogen titanate and/or to a mixed sodium and hydrogen titanate with orthorhombic lattice whose unit cell is described by the space groups 59 Pmmn, 63 Amma, 71 Immm, or 63 Bmmb and the atomic positions presented in Table 2. The intensity and the position of the X-ray diffraction signals corresponding to (001) surface, varies according to the fibers size and the piling level among the nanotubes layers respectively. FIG. 4 is a representative X-ray diffraction pattern of the hydrogen titanate and/or mixed sodium and hydrogen titanate.

TABLE 1

Textural properties of the nanotubes of hydrogen titanate and/or the mixed sodium and hydrogen titanates, obtained from amorphous titanium oxihydroxide as starting material.

| Example | Reaction Temperature (° C.) | Reaction Time (h) | Area ($m^2/g$) | Pore Volume ($cm^3/g$) | Pore Diameter (nm) |
|---|---|---|---|---|---|
| 1 | 100 | 48 | 410 | 0.51 | 3.5 |
| 2 | 120 | 48 | 333 | 0.65 | 4.7 |
| 3 | 140 | 48 | 342 | 0.71 | 5.0 |
| 4 | 160 | 48 | 278 | 0.74 | 6.7 |
| 5 | 180 | 48 | 44 | 0.42 | 21.4 |
| 6 | 100 | 12 | 272 | 0.37 | 4.0 |
| 7 | 100 | 96 | 43 | 0.15 | 6.7 |

As it can be seen in Table 1, depending on the temperature and the hydrothermal reaction time, the nanotubes and/or nanofibers present a specific area between 40 and 500 $m^2/g$ and an average pore diameter between 2 and 25 nm. At high reaction temperatures, above 160° C., Example 5, the specific area of the materials decreases due to the nanofibers and/or nanotubes growth; this same effect is produced with a long reaction time, Example 7. The nanotubes are opened at the ends, as it can be seen in FIGS. 3a-3b, with an internal diameter between 3 and 10 nm, and 1 to 50 layers with a spacing of 0.6 to 1.0 nm between layers.

Table 2. Crystalline arrays of the orthorhombic phase of the hydrogen titanate and/or mixed sodium and hydrogen titanate, which are precursors of the $TiO_{2-x}$ JT Phase, where $0 \leq x \leq 1$.

| System | JT_H | JT_1_H | JT_2_H | JT_3_H |
|---|---|---|---|---|
| Formula | $HTiO_2$ | $HTiO_2$ | $HTiO_2$ | $HTiO_2$ |
| Configuration | Basic unit. One sheet per unit cell. | Two sheets per unit cell. Phase JT with one sheet moved half unit cell along the *b* axis. | Two sheets per unit cell. JT phase with rotation of one of the sheets by 180°. | Two sheets per unit cell. Phase JT with rotation of one of the sheets by 180° and moved half cell along the *b* axis. |
| Figure | | | | |
| Space Group | 59  Pmmn | 63  Amma | 71  Immm | 63  Bmmb |
| Cell Parameters | | | | |
| *a* (nm) | 0.298679 | 0.310556 | 0.302282 | 0.309246 |
| *b* (nm) | 0.365239 | 0.368659 | 0.374325 | 0.351809 |
| *c* (nm) | 0.881823 | 1.885037 | 1.764735 | 1.696627 |
| $\alpha=\beta=\gamma$ ° | 90 | 90 | 90 | 90 |
| Relative Atomic Positions | | | | |
| Atom | a      b      c | a      b      c | a      b      c | a      b      c |
| Ti | 0.50000  0.50000  0.37112 | 0.25000  0.00000  0.80928 | 0.00000  0.00000  0.31273 | 0.00000  0.25000  0.32078 |
| O  | 0.50000  1.00000  1.44423 | 0.75000  0.00000  0.72025 | 0.00000  -0.50000  0.12945 | 0.00000  0.25000  0.72085 |
| O  | 0.50000  1.00000  1.74856 | 0.75000  0.00000  0.85989 | 0.00000  -0.50000  0.27881 | 0.00000  0.25000  0.87794 |
| H  | 0.50000  0.00000  1.97883 | 0.00000  0.00000  0.00000 | 0.00000  -0.39978  0.50000 | 0.00000  0.75000  0.50016 |

Examples 8 to 15

Examples 8 to 15 illustrate the preparation of the nanotubes and/or nanofibers of hydrogen titanate and/or mixed sodium and hydrogen titanate; starting from a titanium oxide (with anatase crystalline structure, a crystal size of 8 nm, an average particle diameter between 0.5 and 2.5 μm, a specific area of 102 m²/g, a pore volume of 0.51 cm³/g, and a pore diameter of 11.3 nm) and using a synthesis procedure which involves a thermal treatment under reflux conditions, aim of the present invention.

7.5 g of titanium oxide with anatase structure is placed in contact with 500 cm³ of a 5 to 20 M aqueous solution of sodium hydroxide. Each of the prepared suspensions in Examples 8 to 14 was submitted to a thermal treatment, under reflux conditions, at a temperature between 80° C. and 110° C. In Table 3, it is specified the reaction time and temperature used in each example. The time interval is between 3 and 48 hours. Only in the case of the Example 15 the formed suspension, containing the titanium precursor and the alkaline metal hydroxide solution, was submitted to a hydrothermal treatment at 160° C. in a closed system under autogenous pressure.

The resulting material from each example, are submitted to a ionic exchange treatment through a washing process with a 1 M solution of chlorhydric acid until the pH of the suspension lowers to a value between 1 and 7. Then all the solutions are aged for a period of time between 12 to 18 hours. Finally, each of the obtained suspensions is filtered, and the thus obtained solids are washed with abundant deionized water and dried at 110° C.

As it is observed in FIGS. 1a and 1b and in FIGS. 3a, 3b and 3c, as well as in the X-ray diffraction, FIG. 4 lines (b) and (c), the obtained materials are basically constituted of nanofibers and/or nanotubes and their structure correspond to a hydrogen titanate and/or mixed sodium and hydrogen titanate, which present an structural array with orthorhombic symmetry with a phase whose unit cell is described by the space groups: 59 Pmmn, 63 Amma, 71 Immm or 63 Bmmb and with the cell parameters and atomic positions presented in Table 2. FIG. 4 is a representative X-ray diffraction pattern of the hydrogen titanate and/or mixed sodium and hydrogen titanate and of the anatase precursor.

TABLE 3

Textural Properties of the nanotubes of hydrogen titanate and/or mixed sodium and hydrogen titanate obtained from anatase titanium oxide as starting material with a crystal size of 8 nm and a average particle diameter between 0.5 and 2.5 μm (500 nm to 2500 nm).

| Sample | Reaction Temperature (° C.) | Reaction Time (h) | Area (m²/g) | Pore Volume (cm³/g) | Pore Diameter (nm) |
|---|---|---|---|---|---|
| 8 | 100 | 3 | 330 | 0.83 | 5.6 |
| 9 | 100 | 6 | 331 | 0.87 | 5.6 |
| 10 | 100 | 12 | 401 | 0.93 | 5.3 |
| 11 | 100 | 24 | 314 | 1.0 | 5.9 |
| 12 | 100 | 48 | 198 | 0.61 | 6.5 |
| 13 | 85 | 48 | 301 | 0.73 | 6.2 |
| 14 | 110 | 6 | 287 | 0.64 | 5.6 |
| 15 | 160* | 48 | 181 | 0.75 | 11.3 |

*Hydrothermal treatment.

As it can be seen in Table 3, depending on the temperature and reaction time fixed during the thermal treatment, the resulting materials present: a specific area between 150 and 500 m²/g, an average pore diameter between 4 and 12 nm and a pore volume between 0.5 and 1.2 cm³/g. The nanotubes are opened at the ends and have 1 to 50 layers with a spacing of 0.6 to 1.0 nm, between layers.

From Examples 8 to 12 in Table 3 it is observed that the optimal thermal treatment time, under reflux conditions, is of 12 hours. A lower or upper time decreases the displayed specific area of the materials. On the other hand, it can be observed that for the experiments carried out at the same reaction time and at a temperature above 100° C., the specific area decreases (Examples 14 compared with example 9); while the decrease of the temperature at long reaction times, Examples 12 and 13, favors the specific area of the nanostructures.

Example 16

This example illustrates the preparation of nanotubes and/or nanofibers of hydrogen titanate and/or mixed sodium and hydrogen titanate starting from a titanium oxide compound with a rutile type crystalline structure with a crystal size of 15 nm with an average particle diameter of 0.25 μm.

1.5 g of a titanium oxide compound with a rutile type crystalline structure is placed in contact with 100 cm³ of a 5 to 20 M aqueous solution of sodium hydroxide. The formed suspension is submitted to a hydrothermal treatment at a temperature of 180° C. during 48 hours and under autogeneous pressure in a closed system.

The resulting material is submitted to an ionic exchange treatment with a 1M solution of chlorhydric acid until the pH of the suspension lowers to a value between 1 and 7. Then the solution is aged for a period of time between 12 and 18 hours. After aging, the suspension is filtered and the thus obtained solid is washed with abundant deionized water and dried at 110° C.

The material obtained in this example showed similar characteristics to the materials obtained in the former Examples 1 to 15. It is basically constituted of nanofibers and/or nanotubes FIGS. 1(a and b). Its X-ray diffraction pattern, FIG. 4 lines (b) and (c), shows that its structure corresponds to a hydrogen titanate and/or to a mixed sodium and hydrogen titanate with orthorhombic structure whose unit cell is described by any of the following space groups: 59 Pmmn, 63 Amma, 71 Immm or 63 Bmmb, reported in Table 2. FIG. 4 is a representative X-ray diffraction pattern of the hydrogen titanate and/or mixed sodium and hydrogen titanate.

The nanotubes and/or nanofibers are constituted by 1 to 50 layers, presenting a specific area between 50 and 100 m²/g and an average pore diameter between 2 and 15 nm.

Example 17

This example illustrates the preparation of nanotubes of hydrogen titanate and/or mixed sodium and hydrogen titanate starting directly from a rutile mineral with an average particle diameter between 20 and 50 μm.

1.5 g of highly crystalline rutile mineral is placed in contact with 100 cm³ of a 5 to 20 M aqueous solution of sodium hydroxide. The formed suspension is submitted to a hydrothermal treatment, at a temperature of 180° C., during 72 hours and under autogeneous pressure in a closed system.

The resulting material is submitted to an ionic exchange treatment with a 1M solution of chlorhydric acid until the pH of the suspension lowers to a value between 2 and 6. Then the solution is aged for a period of time between 12 and 18 hours. After aging, the suspension is filtered and the thus obtained solid is washed with abundant deionized water and dried at 110° C.

The material obtained in this example showed similar characteristics to the materials obtained in the former Examples 1 to 16. It is basically constituted of nanofibers and/or nanotubes of FIGS. 1a and 1b. Its X-ray diffraction pattern, FIG. 4 line-type (c), shows that its structure corresponds to a hydrogen titanate and/or to a mixed sodium and hydrogen titanate with orthorhombic structure whose unit cell is described by any of the following space groups: 59 Pmmn, 63 Amma, 71 Immm or 63 Bmmb, reported in Table 2. We recall that FIG. 4 is a representative X-ray diffraction pattern of the hydrogen titanate and/or mixed sodium and hydrogen titanate and of anatase.

The nanotubes and/or nanofibers are constituted by several layers, presenting a specific area between 3 and 50 $m^2/g$ and an average pore diameter between 2 and 15 nm.

Examples 18 to 20

Examples 18 to 20 illustrate the preparation of the nanotubes of hydrogen titanate and/or mixed sodium and hydrogen titanate, starting from $TiO_2$ compounds with anatase structure with different crystal size and different average particle diameter and different textural characteristics, which are presented in Table 4.

150 g of a $TiO_2$ compound with anatase structure, sample A to C in Table 4, are placed in contact with 3 liters of a 5 to 20 M aqueous solution of sodium hydroxide. Each of the formed suspensions, for each titanium oxide sample with anatase structure from the Examples 18 to 20, is submitted to a hydrothermal treatment at a temperature of 100° C. under autogeneous pressure in a closed system and during 24 hours.

The resulting material was put into contact with a 1 M solution of chlorhydric acid, to perform the ionic exchange where the sodium is replace by hydrogen, until the pH of the suspension lowered its value between 1 and 7. Then the suspension is kept under constant stirring for a period of time between 1 and 24 hours. Finally, the suspension was filtered, it was washed with abundant deionized water and the solid was dried at 110° C.

The resulting materials in each of the examples are basically composed of nanofibers and/or nanotubes, according to what is observed in FIGS. 1a and 1b and FIGS. 3a, 3b and 3c. The X-ray diffraction pattern, FIG. 4 lines (b), shows that the structure corresponds to a hydrogen titanate and/or to a mixed sodium and hydrogen titanate with orthorhombic structure and a unit cell described by the space groups presented in Table 2. Also, in FIG. 4, it is observed that the intensity and the position of the X-ray diffraction peak that corresponds to the (001) plane, varies depending on the size of the fibers and depending on the piling level between the layers of the nanotubes, which are ruled by the textural and morphological characteristics of the $TiO_2$ used as starting material. FIG. 4 is a representative X-ray diffraction pattern of the hydrogen titanate and/or mixed sodium and hydrogen titanate and of anatase.

Under the same synthesis conditions the nanofibers and/or nanotubes growth depends on the textural and morphological characteristics of the $TiO_2$ compound used as starting material. The nanotubes are constituted of 1 to 50 layers, with a space between layers of 0.6 to 1.7 nm. The nanotubes are opened by the ends as it is observed in FIG. 3a with an internal diameter between 3 and 10 nm, presenting a specific area between 300 and 450 $m^2/g$ and an average pore diameter between 4 and 10 nm, as it can be seen in Table 5.

TABLE 4

Textural properties of the titanium oxide with anatase structure used as starting material for the synthesis of the hydrogen titanates and/or mixed sodium and hydrogen titanates.

| Anatase Phase $TiO_2$ Compound | Crystal Size (nm) | Average Particle or aggregate Diameter (μm) | Specific Area ($m^2/g$) | Average Pore Volume ($cm^3/g$) | Average Pore Diameter (nm) |
|---|---|---|---|---|---|
| A | 8 | 0.5 a 2.5 | 102 | 0.42 | 16.5 |
| B | 8 | 2.5 a 8 | 101 | 0.37 | 14.5 |
| C | 5 | <1 | 324 | 0.33 | 4.0 |

TABLE 5

Textural properties of titanium oxide with tubular structure obtained for Examples 18 to 20.

| Example | $TiO_2$ Anatase Phase Compound Table 4 | Specific Area ($m^2/g$) | Pore Volume ($cm^3/g$) | Average Pore Diameter (nm) |
|---|---|---|---|---|
| 18 | A | 316 | 0.72 | 9.1 |
| 19 | B | 389 | 0.70 | 7.2 |
| 20 | C | 401 | 0.77 | 7.7 |

Conditions: 100° C., autogenous pressure, reaction time of 24 hours, exchange of 18 hours.

Example 21 to 25

Examples 21 to 25 illustrate the influence of the hydrothermal reaction time in the synthesis of nanotubes and/or nanofibers of hydrogen titanate and/or mixed sodium and hydrogen titanate starting from a $TiO_2$ compound with anatase phase whose characteristics are described in Table 4, samples A to C.

In each case, 150 g of compounds A and C in Table 4, which are titanium oxide with anatase structure, were put into contact with 3 liters of a 5 to 20 M aqueous solution of sodium hydroxide. The suspension formed was submitted to a hydrothermal treatment, at a 100° C. temperature under autogenous pressure in a closed system during a period of time between 3 and 14 hours.

The resulting materials of each example were put in contact with a 1M chlorhydric acid solution, to exchange the sodium ions for hydrogen, until the pH of the suspension lowered to a value between 1 and 7. Then the suspension was left on constant stirring for a period of time between 1 and 24 hours. After aging, the suspension was filtered and the obtained solid was washed with sufficient deionized water and dried at 110° C.

The resulting materials of each of the examples presented similar characteristics to the former Examples 1 to 25. They are basically constituted of nanofibers and/or nanotubes, according to what is observed in FIGS. 1a and 1b and FIGS. 3a, 3b and 3c. In FIG. 4 curves b, it is observed that the structure corresponds to a hydrogen titanate and/or to a mixed sodium and hydrogen titanate with orthorhombic structure, whose unit cell is described by the space groups and atomic positions presented in Table 2. Also, in FIG. 4, it is observed that the intensity and the position of the X-ray diffraction peak that corresponds to the (001) plane, varies depending on the size of the fibers and depending on the piling level between the layers of the nanotubes. Thus, the growth of the nanotubes both in the radial direction and the longitudinal direction is also ruled by the time of the hydrothermal reaction and the ionic exchange time with an acid solution. FIG. 4 is a representative X-ray diffraction pattern of the hydrogen titanate and/or mixed sodium and hydrogen titanate and of anatase.

The nanotubes are composed of 1 to 50 layers, with a 0.6 to 1.7 nm of spacing between layers. The nanotubes are opened, as it can be seen in FIG. 3(b) with an internal diameter between 3 and 10 nm, presenting a specific area between 380 and 470 m$^2$/g and an average pore diameter between 5 and 8 nm, as can be observed in Table 6.

similar to those shown in FIG. 4, curve b, which correspond to the structure of the hydrogen titanate with orthorhombic structure, whose unit cell is described by the space groups and atomic positions presented in Table 2. Also, in FIG. 4, it is observed that the intensity and the position of the X-ray diffraction peak that corresponds to the (001) plane varies depending on the size of the fibers and depending on the piling level between the layers of the nanotubes. The textural and morphological characteristics of the nanotubes resemble those of the TiO$_2$ used as starting material.

TABLE 6

Textural properties of the nanotubes of hydrogen titanate and/or mixed sodium and hydrogen titanates, obtained at different reaction times and ionic exchange according to examples 21 to 25.

| Example | TiO$_2$ Anatase Phase Compound Table 4 | Reaction Time (h) | Ionic Exchange Time (h) | Specific Area (m$^2$/g) | Average Pore Volume (cm$^3$/g) | Average Pore Diameter (nm) |
|---|---|---|---|---|---|---|
| 21 | A | 3 | 1 | 414 | 0.78 | 7.6 |
| 22 | A | 3 | 18 | 450 | 0.72 | 6.4 |
| 23 | A | 6 | 18 | 386 | 0.63 | 6.6 |
| 24 | C | 3 | 1 | 464 | 0.67 | 5.8 |
| 25 | C | 6 | 1 | 464 | 0.77 | 6.6 |

Conditions: 100° C., autogenous pressure.

As it can be seen from Table 6, using the same starting material and at the same temperature of synthesis, the growth of the nanofibers and/or nanotubes depends on the time of both the hydrothermal reaction and the ionic exchange; the larger the hydrothermal reaction time, the bigger the nanotubes size; while as the ionic exchange time is increased, with the acid solution at a constant pH, the size of the nanofibers decreases.

Examples 26 to 29

Examples 26 to 29 illustrate the synthesis of the nanotubes of hydrogen titanate and/or mixed sodium and hydrogen titanate starting from the A to C compounds of Table 4, which comprise different compounds of TiO$_2$ anatase phase, used as starting material, and a synthesis procedure consisting of a thermal treatment under reflux conditions.

In each case, 150 g of titanium oxide with anatase structure, compounds A to C in Table 4, were put into contact with 3 litters of a 5 to 20 M aqueous solution of sodium hydroxide. The suspension formed was submitted to a synthesis procedure consisting of a thermal treatment under reflux condition, at a temperature of 100° C. and at atmospheric pressure, in a system with continuous stirring between 10 and 1,000 rpm, preferably 100-500 rpm, during a 3 hour reaction period.

The resulting material was put in contact with a 1M solution of chlorhydric acid to perform a sodium ionic exchange for hydrogen until the pH of the suspension lowers to a value between 1 and 7. Then the suspension was aged for a 3 hour period for Examples 26 to 28 and for an 18 hour period for the case of Example 29. After aging the suspension was filtered and the obtained solid was washed with sufficient deionized water and dried at 110° C.

The resulting materials of each of the examples presented similar characteristics to the former Examples 1 to 25. They are basically constituted of nanofibers and/or nanotubes, according to what is observed in FIGS. 1a and 1b and FIGS. 3a, 3b and 3c. The X-ray diffraction patterns obtained are

TABLE 7

Textural properties of the nanotubes of hydrogen titanate and/or mixed sodium and hydrogen titanate, obtained from different anatase compounds using a procedure that involves thermal treatment under reflux conditions, with different ionic exchange time according to examples 26 to 29.

| Example | TiO$_2$ Anatase Phase Compound Table 4 | Reaction Time (h) | Ionic Exchange Time (h) | Specific Area (m$^2$/g) | Average Pore Volume (cm$^3$/g) | Average Pore Diameter (nm) |
|---|---|---|---|---|---|---|
| 26 | A | 3 | 3 | 414 | 0.83 | 8.0 |
| 27 | B | 3 | 3 | 369 | 0.58 | 6.3 |
| 28 | C | 3 | 3 | 417 | 0.65 | 6.3 |
| 29 | B | 3 | 18 | 346 | 0.61 | 7.0 |

Conditions: 100° C., autogenous pressure.

Figure 3:
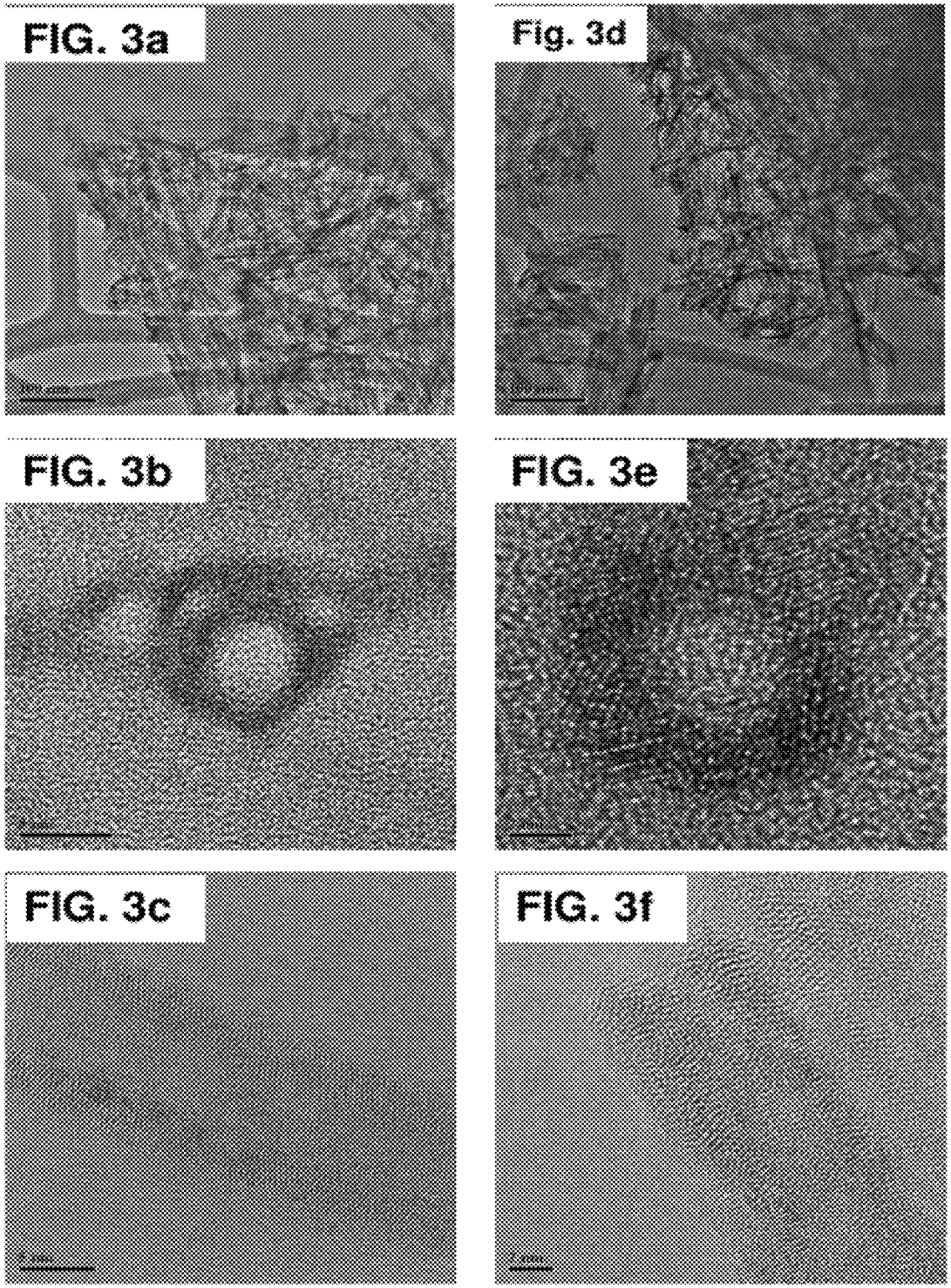
FIGS. 3a-3f show transmission electron microscopy (TEM) images where FIGS. 3a, 3b and 3c correspond to nanotubes of hydrogen titanates and mixed sodium and hydrogen titanates, and FIGS. 3d-3f correspond to nanotubes of $TiO_{2-x}$ JT phase, where $0 \leq x \leq 1$.

As it can be seen from Table 7, at constant synthesis conditions, the nanofibers and/or nanotubes growth depends on the textural and morphological characteristics of the TiO$_2$ anatase phase used as starting material, when the later is submitted to a thermal treatment under reflux conditions. The nanotubes are composed of 1 to 50 layers, with a space between layers of 0.6 to 1.7 nm. The nanotubes are opened, as it can be seen in FIG. 3b with an internal diameter between 5 and 9 nm, presenting a specific area between 340 and 420 m$^2$/g and an average pore diameter between 2 and 10 nm. FIG. 3 is an example of a typical TEM image of our hydrogen titanate and/or mixed sodium and hydrogen titanate material.

Examples 30 and 31

Examples 30 and 31 illustrate the synthesis of the nanotubes of hydrogen titanate and/or mixed sodium and hydrogen titanate starting from the B compound in Table 4. There is no need of acid treatment to perform the ionic exchange of sodium by hydrogen.

150 g of the B compound in Table 4, which is a titanium oxide with anatase structure, was put in contact with 3 liters of a 5 to 20 M aqueous solution of sodium hydroxide. The suspension formed was submitted to a synthesis procedure comprising a hydrothermal treatment under reflux conditions, at a 100° C. temperature, autogenous pressure in a closed system, with continuous stirring between 10 and 1,000 rpm, preferably 100-500 rpm, during a period of 3 hours of reaction time.

In comparison with the former examples, in the case of Example 30 the resulting material was not put in contact with a chlorhydric acid solution to perform the ionic exchange of sodium by hydrogen, but in this case the solution was exhaustively washed with ethyl alcohol until de suspension pH decreased to a value between 6 and 7. It was filtered, and dried at 110° C.

For the case reported in Example 31, the resulting material from the hydrothermal treatment stage was exhaustively washed with abundant bi-distilled water until the suspension pH decreased to a value between 7 and 8, then it was filtered and dried at 110° C.

The resulting materials in each of the examples presented similar characteristics to the former Examples 1 to 29. They are basically constituted of nanofibers and/or nanotubes according to FIGS. 1a and 1b and FIG. 3b. The obtained X-ray diffraction patterns are similar to those presented in FIG. 4 line b, which shows that the structure corresponds to a hydrogen titanate and/or to a mixed sodium and hydrogen titanate with orthorhombic structure whose unit cell is described by any of the following space groups: 59 Pmmn, 63 Amma, 71 Immm or 63 Bmmb, reported in Table 2.

The nanotubes and/or nanofibers are constituted by 1 to 50 layers with a space between layers of 0.6 to 1.7 nm. The nanotubes are opened at the end (FIG. 3b) and they present an internal diameter between 3 and 10 nm, a specific area between 180 and 310 m²/g and an average pore diameter between 4 and 8 nm, as it can be seen in Table 8.

TABLE 8

Textural properties of the hydrogen titanate and/or mixed sodium and hydrogen titanate obtained by the procedure of washings with water or ethyl alcohol.

| Example | Washing Solvent | Specific Area (m²/g) | Pore Volume (cm³/g) | Pore Diameter (nm) |
|---|---|---|---|---|
| 30 | ethyl alcohol | 303.96 | 0.544 | 7.16 |
| 31 | water | 185 | 0.203 | 4.38 |

From Examples 30 and 31, it can be said that the ionic exchange of sodium by hydrogen can be done with different washing solvents.

Examples 32 to 43

The nanotubes with hydrogen titanate structure obtained through the procedures described in the former examples, were submitted to a thermal treatment process at a temperature between 200° C. and 400° C. in an dynamic oxidizing or inert or reducing atmosphere, thus obtaining the nanomaterial $TiO_{2-x}$ JT phase, where $0 \leq x \leq 1$, with an orthorhombic structure whose structural characteristics are described by any of the following space groups: 59 Pmmn, 63 Amma, 71 Immm or 63 Bmmb; and the cell parameters and atomic positions presented in Table 9.

The materials obtained in the Examples 32 to 43 present an orthorhombic structure of $TiO_{2-x}$ JT phase, where $0 \leq x \leq 1$, aim of the present invention, and that keep the nanofibers and/or nanotubes morphology that is present in the hydrogen titanates and/or mixed sodium and hydrogen titanates, which originated these materials after a thermal treatment in a dynamic oxidizing or inert or reducing atmosphere as it is shown in the scanning electron microscopy images (SEM) in FIG. 1c and FIGS. 3d, 3e and 3f.

Also, the nanotubes obtained after the thermal treatment in a dynamic oxidizing or inert or reducing atmosphere, present an orthorhombic structure, with a crystalline phase named as the JT phase of titanium oxide $TiO_{2-x}$, where $0 \leq x \leq 1$. The term "JT phase" means "a crystalline structure or crystalline phase with an orthorhombic symmetry having the formula $TiO_{2-x}$, wherein $0 \leq x \leq 1$, and has at least one of the space groups 59 Pmmn, 63 Amma, 71 Immm or 63 Bmmb." As it can be seen in FIG. 7, the X-ray diffraction peak corresponding to the (001) plane is kept. This peak is also observed in the case of the precursor materials, FIG. 4 curves b and c, which are the hydrogen titanate and/or the mixed sodium and hydrogen titanate.

Through the X-ray dispersive energy (EDX) spectrum presented in FIG. 2c, it is concluded that the nanostructures $TiO_{2-x}$ JT phase, where $0 \leq x \leq 1$, present a high oxygen deficiency. In this spectrum is observed that the chemical composition is Ti and O, with an O/Ti atomic ratio between 1 and 1.9, which indicates a high oxygen deficiency.

The materials with the orthorhombic structure, with a crystalline phase $TiO_{2-x}$ JT phase, where $0 \leq x \leq 1$, aims of the present invention, present a morphology of nanofibers and/or nanotubes as it can be observed in FIG. 1c and FIGS. 3d, 3e and 3f. The cell parameters of the phase called in this invention as JT, whose cell parameters and relative atomic coordinates do not match with any of the known titania phases, were determined experimentally. The electron diffraction patterns of isolated nanofibers, see FIGS. 11a, 11b and 11d, were used to obtain the a and b cell parameters. The c parameter of the unit cell was obtained with high resolution transmission electron microscopy (HRTEM). An HRTEM image is presented in FIG. 12. In FIG. 12, the nanotubes obtained in the Examples 32 to 41 with orthorhombic structure are shown. An interlayer space of 0.7 nm that corresponds to the (001) plane and that is related to the c parameter of the unit cell, which represents the space between the layers that constitute the nanotube walls, as observed in FIG. 10. The observed experimental cell parameters are a=0.317 nm, b=0.360 nm, and c=0.700 nm. The experimental results agree with the same results obtained by theoretical simulation (see Table 9). In FIG. 11c it is shown the theoretically calculated electron diffraction pattern, for the theoretical model of the JT phase, with orthorhombic structure that is presented in FIGS. 9a and 9b, and as it can be seen the theoretical pattern agrees well with the experimental electron diffraction pattern presented in FIG. 11b. From the experimental electron diffraction pattern presented in FIG. 11c it can be seen that the angle formed between the cell parameters a and b is equal to 90°. In FIG. 11d, which corresponds to an experimental electron diffraction pattern of a nanotube and where the reflections (001) and (020) are shown, it can be seen that the angle formed between the cell parameters b and c is equal to 90°. Thus, the structure corresponds to a crystalline lattice which is orthorhombic and that has been confirmed by theoretical modeling using the structure presented in FIGS. 9a and 9b, whose cell parameters and angles agree with the experimental data (see Table 9). The positions of the atoms inside the orthorhombic lattice of the JT phase do not match with the position of the atoms in brookite, which also has an orthorhombic lattice but has a different, single space group 61 Pbca, or in any other known phase of titania.

Table 9. Crystalline arrays of the unit cell of $TiO_{2-x}$ phase JT, where $0 \leq x \leq 1$.

| System | JT | JT_1 | JT_2 | JT_3 |
|---|---|---|---|---|
| Configuration | Basic unit. One sheet per unit cell. | Two sheets per unit cell. Phase JT with one sheet moved half unit cell along the $b$ axis. | Two sheets per unit cell. JT phase with rotation of one of the sheets by 180°. | Two sheets per unit cell. Phase JT with rotation of one of the sheets by 180° and moved half cell along the $b$ axis. |
| Figure | | | | |
| Space Group | 59 Pmmn | 63 Amma | 71 Immm | 63 Bmmb |
| Cell Parameters | | | | |
| $a$ (nm) | 0.303772 | 0.304158 | 0.303414 | 0.303326 |
| $b$ (nm) | 0.373553 | 0.373715 | 0.374958 | 0.37423 |
| $c$ (nm) | 0.715056 | 1.427495 | 1.43262 | 1.427982 |
| $\alpha=\beta=\gamma°$ | 90 | 90 | 90 | 90 |
| Relative Atomic Coordiantes | | | | |

| Atom | a | b | c | a | b | c | a | b | c | a | b | c |
|---|---|---|---|---|---|---|---|---|---|---|---|---|
| Ti | 0.00000 | 0.00000 | -0.15479 | 0.25000 | 0.00000 | 0.67265 | -1.00000 | 0.00000 | 0.67361 | 0.00000 | 0.25000 | 0.82710 |
| O | 0.00000 | 0.50000 | 0.29540 | 0.25000 | 0.50000 | 0.89758 | -1.00000 | -0.50000 | -0.10362 | 0.00000 | 0.75000 | 0.60200 |
| O | 0.00000 | 0.50000 | -0.07264 | 0.25000 | 0.50000 | 0.71363 | -1.00000 | -0.50000 | 0.71351 | 0.00000 | 0.75000 | 0.78604 |

The calculated cell parameters of the unit cell of the $TiO_{2-x}$ JT, where $0 \leq x \leq 1$, are reported in Table 9 and they vary between the following intervals: a from 0.283 to 0.324 nm, b from 0.354 to 0.395 nm and c from 0.695 to 0.735 nm, for the case of the 59 Pmmn space group, and from 1.408 nm to 1.453, for the case of the 63 Amma, 71 Immm, and 63 Bmmb space groups; with $\alpha=\beta=\gamma=90°$. It is observed that the nanofibers and/or nanotubes grow preferably in the b axis direction. In Table 9 the atoms positions for each space group of the JT phase and its variations are given. All the information given in Table 9 compare very well with the experimental data and as it can be seen the information given in Table 9 do not match with any of the known phases of titania.

Also, the titanium oxide nanotubes with structure $TiO_{2-x}$ JT phase, where $0 \leq x \leq 1$, present a specific area between 100 and 400 m$^2$/g, with a distribution of pore size that presents a pore average diameter between 4 and 10 nm, as shown in Table 10. The titanium oxide nanotubes with $TiO_{2-x}$ phase JT, where $0 \leq x \leq 1$, are originated from the thermal treatment, in a dynamic oxidizing or inert or reducing atmosphere, of the hydrogen titanates and/or mixed sodium and hydrogen titanates, keeping the nanotubular structure and the high specific area after the thermal treatment, which means that this material, the titanium oxide nanotubes with structure $TiO_{2-x}$ JT phase, where $0 \leq x \leq 1$, is thermally stable with potential applications as catalysts and/or as a catalysts support and in other processes involving the adsorption phenomena.

From Examples 32 to 41 (see Table 10) it can be said that while the initial area of the titanate precursor determines the area of the JT material, an increase in the temperature lowers the JT area. In Examples 32 and 33 the areas of the titanate starting materials are 342 m$^2$/g and 278 m$^2$/g, respectively; whereas in Examples 34 through 39 the area of the titanate starting material is around 400m$^2$/g, hence for this examples it is obtained a JT material with a larger area. In example 40 the area of the titanate starting material is 369 m$^2$/g, which is larger but not much from that in Example 32. Nevertheless the difference in the JT area is quite important. This can be explained because the thermal treatment was different. In example 32 the thermal treatment was done in a static oxidizing atmosphere. Examples 42 and 43 are originated from the thermal treatment in a dynamic reducing atmosphere composed of a mixture of 5% or 30% by volume of $H_2$ in $N_2$, respectively; of the hydrogen titanates and/or mixed sodium and hydrogen titanates. As it can be seen in Table 10 the starting materials for examples 42 and 43 were the same used in examples 39 and 36 respectively. The only difference is the dynamic atmosphere used and as it can be seen the use of a reducing atmosphere for thermal treatment can be successfully applied. The obtained specific surface areas for examples 42 and 39 are quite similar and the same happens when comparing examples 43 and 36. In general de difference in the area is approximately 10 m$^2$/g less for the examples under dynamic reducing atmosphere.

TABLE 10

Textural properties of the nanotubes with structure $TiO_{2-x}$ JT phase, where $0 \leq x \leq 1$, prepared from the indicated examples and after heat treatment.

| Example | Precursor (specific area, m$^2$/g) | Temperature (° C.) | Time (h) | Area (m$^2$/g) | Pore Volume (cm$^3$/g) | Pore Diameter (nm) |
|---|---|---|---|---|---|---|
| 32[b] | 3 (342) | 400 | 4 | 214 | 0.74 | 7.7 |
| 33[b] | 4 (278) | 400 | 4 | 127 | 0.44 | 9.2 |
| 34[a] | 19 (389) | 200 | 4 | 348 | 0.73 | 6.3 |
| 35[a] | 19 (389) | 300 | 4 | 339 | 0.64 | 7.6 |
| 36[a] | 19 (389) | 400 | 4 | 289 | 0.70 | 9.7 |
| 37[a] | 20 (401) | 400 | 4 | 319 | 0.54 | 4.8 |
| 38[a] | 20 (401) | 400 | 4 | 323 | 0.54 | 4.8 |
| 39[a] | 26 (414) | 400 | 4 | 326 | 0.54 | 4.7 |
| 40[a] | 27 (369) | 400 | 4 | 325 | 0.54 | 4.7 |
| 41[c] | 27 (369) | 400 | 4 | 286 | 0.68 | 7.1 |
| 42[d] | 26 (414) | 400 | 4 | 313 | 0.64 | 6.0 |
| 43[e] | 19 (389) | 400 | 4 | 279 | 0.70 | 7.5 |

[a]Thermal treatment temperature in dynamic oxidizing atmosphere.
[b]Thermal treatment by calcining in a static oxidizing atmosphere, i.e. in an oven.
[c]Thermal treatment in dynamic nitrogen atmosphere.
[d]Thermal treatment in dynamic reducing atmosphere composed of a mixture of 5% by volume of hydrogen in $N_2$.
[e]Thermal treatment in dynamic reducing atmosphere composed of a mixture of 30% by volume of hydrogen in $N_2$.

What is claimed is:

1. Nanomaterial of hydrogen titanate and/or mixed sodium and hydrogen titanate, having the formula $HTiO_2$ and/or $Na_xH_{1-x}TiO_2$, wherein x is from 0 to less than 1, the hydrogen and sodium atoms are in the interlayer regions of the orthorhombic structure and said nanomaterial has a nanotubular morphology constituted of piled structural layers that are folded or rolled inwards into themselves, or formed by overlapped semitubes.

2. The nanomaterial of claim 1, wherein said nanomaterial has an orthorhombic structure, which is isostructural with $TiO_{2-x}$, where $0 \leq x \leq 1$ and whose unit cell is described by at least one of the space groups 59 Pmmn, 63 Amma, 71 Immm or 63 Bmmb.

3. The nanomaterial of claim 1, wherein the cell parameters for the space groups of said orthorhombic crystalline lattice are, respectively: a from 0.263 nm to 0.331 nm; b from 0.332 nm to 0.448 nm, and c from 0.635 nm to 0.902 nm, for the space group 59 Pmmn, and a from 0.263 nm to 0.331 nm; b from 0.332 nm to 0.448 nm, and c from 1.368 nm to 1.905, for the space groups 63 Amma, 71 Immm, and 63 Bmmb; with $\alpha=\beta=90°$.

4. The nanomaterial of claim 1, wherein said nanomaterial has a disordered mesoporosity with an average pore diameter between 3 and 25 nm and a specific area between 100 and 600 m$^2$/g.

5. The nanomaterial of claim 1, wherein said nanomaterial has a nanotubular morphology with dimensions of 3 to 50 nm in diameter and lengths from 0.1 to 100 μm.

6. The nanomaterial of claim 1, wherein said nanomaterial has a nanotubular morphology constituted by 1 to 50 structural layers with an inter-layer spacing in the range of 0.635 nm to 0.902 nm for the 59 Pmmn space group, and from 0.684 nm to 0.953 for the 63 Amma, 71 Immm, and 63 Bmmb space groups.

7. The nanomaterial of claim 1, wherein said nanomaterial is hydrogen titanate and a mixed sodium and hydrogen titanate in which the hydrogen and sodium atoms are in the interlayer regions of the orthorhombic structure.

8. The nanomaterial of claim 7, wherein said nanomaterial has an orthorhombic structure, which is isostructural with $TiO_{2-x}$ where $0 \leq x \leq 1$ and whose unit cell is described by at least one of the space groups 59 Pmmn, 63 Amma, 71 Immm or 63 Bmmb.

9. The nanomaterial of claim 1, wherein said nanomaterial has the X-ray diffraction pattern of FIG. 4 curve (b).

10. The nanomaterial of claim 1, wherein the nanomaterial has a nanotubular morphology with an internal diameter between 3 and 10 nm and a specific surface area between 380 and 470 m$^2$/g and an average pore diameter between 5 and 8 nm.

11. A method for the production of nanotubes of hydrogen titanate and/or mixed sodium and hydrogen titanate comprising contacting a titanium oxide of the anatase phase, said anatase phase titanium dioxide having a crystal size between 5 and 10 nm with sodium hydroxide to form a suspension, subjecting said suspension to a synthesis procedure with reflux in a closed system with continuous stifling between 100-500 rpm under autogenous pressure at a temperature in the range of 80° to 120° C. to form a hydrogen titanate and/or a mixed sodium and hydrogen titanate with orthorhombic structure.

12. Nanotubes of hydrogen titanate and/or mixed sodium and hydrogen titanate, having the formula $HTiO_2$ and/or $Na_xH_{1-x}TiO_2$, wherein x is from 0 to less than 1 made according to the process of claim 11.

* * * * *